(12) United States Patent  (10) Patent No.: US 8,472,594 B2
New et al.  (45) Date of Patent: *Jun. 25, 2013

(54) SYSTEMS AND METHODS FOR PERSONAL IDENTIFICATION NUMBER DISTRIBUTION AND DELIVERY

(75) Inventors: Darren New, San Diego, CA (US); Miles Paschini, Rancho Sante Fe, CA (US); Marshall Rose, Sacramento, CA (US)

(73) Assignee: EWI Holdings, Inc., San Diego, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/719,741

(22) Filed: Mar. 8, 2010

(65) Prior Publication Data

US 2010/0254522 A1 Oct. 7, 2010

Related U.S. Application Data

(63) Continuation of application No. 11/007,663, filed on Dec. 7, 2004, now Pat. No. 7,676,030, and a continuation-in-part of application No. 10/316,603, filed on Dec. 10, 2002, now Pat. No. 7,522,716, which is a continuation of application No. 09/619,392, filed on Jul. 19, 2000, now Pat. No. 6,526,130.

(51) Int. Cl.
*H04M 11/00* (2006.01)

(52) U.S. Cl.
USPC ............ 379/93.12; 379/93.17; 379/114.9; 705/14.23; 705/42

(58) Field of Classification Search
USPC ........ 379/90.01, 93.25, 93.12, 93.17, 110.01, 379/114.19, 114.2, 114.15, 114.17, 144.01; 705/14.23, 14.26, 14.51, 18, 26.35, 37, 39, 705/42–45
See application file for complete search history.

(56) References Cited

U.S. PATENT DOCUMENTS

| 4,359,631 A | 11/1982 | Lockwood et al. |
| 4,567,359 A | 1/1986 | Lockwood |
| RE32,115 E | 4/1986 | Lockwood et al. |

(Continued)

FOREIGN PATENT DOCUMENTS

| DE | 4017264 A1 | 12/1991 |
| EP | 0863537 A1 | 9/1998 |

(Continued)

OTHER PUBLICATIONS

U.S. Appl. No. 12/711,211 Non-Final Rejection Oct. 1, 2010.

(Continued)

*Primary Examiner* — Md S Elahee
(74) *Attorney, Agent, or Firm* — Conley Rose, P.C.; Jerry C. Harris, Jr.

(57) ABSTRACT

Systems and methods for obtaining a personal identification number (PIN) from a client terminal are disclosed. A method includes storing, at the client terminal, PINs for plural prepaid services. The method also includes receiving, at the client terminal, a request for a PIN associated with a desired prepaid service corresponding to one of the plural prepaid services. A PIN request is then sent, from the client terminal, to a server when less than a predefined number of PINs associated with the desired prepaid service are stored at the client terminal. In response, one or more PINs associated with the desired prepaid service are received at the client terminal. The method further includes dispensing at least one PIN corresponding to the desired prepaid service from the client terminal.

14 Claims, 26 Drawing Sheets

U.S. PATENT DOCUMENTS

| | | |
|---|---|---|
| 5,220,501 A | 6/1993 | Lawlor et al. |
| 5,291,017 A | 3/1994 | Wang et al. |
| 5,309,355 A | 5/1994 | Lockwood |
| 5,350,906 A | 9/1994 | Brody et al. |
| 5,468,958 A | 11/1995 | Franzen et al. |
| 5,477,038 A | 12/1995 | Levine et al. |
| 5,500,514 A | 3/1996 | Veeneman et al. |
| 5,569,917 A | 10/1996 | Buttrill, Jr. et al. |
| 5,576,951 A | 11/1996 | Lockwood |
| 5,577,109 A | 11/1996 | Stimson et al. |
| 5,578,808 A | 11/1996 | Taylor |
| 5,621,787 A | 4/1997 | McKow et al. |
| 5,645,434 A | 7/1997 | Leung |
| 5,693,941 A | 12/1997 | Barlow et al. |
| 5,696,908 A | 12/1997 | Muehlberger et al. |
| 5,701,301 A | 12/1997 | Weisser, Jr. |
| 5,714,755 A | 2/1998 | Wells et al. |
| 5,722,067 A | 2/1998 | Fougnies et al. |
| 5,763,878 A | 6/1998 | Franzen |
| 5,778,313 A | 7/1998 | Fougnies |
| 5,812,773 A | 9/1998 | Norin |
| 5,828,740 A | 10/1998 | Khue et al. |
| 5,845,259 A | 12/1998 | West et al. |
| 5,854,975 A | 12/1998 | Fougnies et al. |
| 5,868,236 A | 2/1999 | Rademacher |
| 5,884,292 A | 3/1999 | Baker et al. |
| 5,897,625 A | 4/1999 | Gustin et al. |
| 5,903,633 A | 5/1999 | Lorsch |
| 5,937,396 A | 8/1999 | Konya |
| 5,945,653 A | 8/1999 | Walker et al. |
| 5,991,380 A | 11/1999 | Bruno et al. |
| 5,991,381 A | 11/1999 | Bouanaka et al. |
| 5,991,413 A | 11/1999 | Arditi et al. |
| 5,991,749 A | 11/1999 | Morrill, Jr. |
| 5,991,809 A | 11/1999 | Kriegsman |
| 6,000,608 A | 12/1999 | Dorf |
| 6,012,048 A | 1/2000 | Gustin et al. |
| 6,035,025 A | 3/2000 | Hanson |
| 6,049,774 A | 4/2000 | Roy |
| 6,058,300 A | 5/2000 | Hanson |
| 6,064,990 A | 5/2000 | Goldsmith |
| 6,081,791 A | 6/2000 | Clark |
| 6,081,840 A | 6/2000 | Zhao |
| 6,157,823 A | 12/2000 | Fougnies et al. |
| 6,169,975 B1 | 1/2001 | White et al. |
| 6,182,138 B1 | 1/2001 | Aoki |
| 6,185,545 B1 | 2/2001 | Resnick et al. |
| 6,188,752 B1 | 2/2001 | Lesley |
| 6,191,699 B1 | 2/2001 | Sawada |
| 6,209,032 B1 | 3/2001 | Dutcher et al. |
| 6,264,104 B1 | 7/2001 | Jenkins et al. |
| 6,269,343 B1 | 7/2001 | Pallakoff |
| 6,289,319 B1 | 9/2001 | Lockwood |
| 6,289,320 B1 | 9/2001 | Drummond et al. |
| 6,294,780 B1 | 9/2001 | Wells et al. |
| 6,317,754 B1 | 11/2001 | Peng |
| 6,327,363 B1 | 12/2001 | Henderson et al. |
| 6,453,162 B1 | 9/2002 | Gentry |
| 6,526,130 B1 | 2/2003 | Paschini |
| 6,526,275 B1 | 2/2003 | Calbert |
| 6,574,617 B1 | 6/2003 | Immerman et al. |
| 6,581,827 B2 | 6/2003 | Welton |
| 6,628,766 B1 | 9/2003 | Hollis et al. |
| 6,651,885 B1 | 11/2003 | Arias |
| 6,742,023 B1 | 5/2004 | Fanning et al. |
| 6,827,260 B2 | 12/2004 | Stoutenburg |
| 6,829,596 B1 | 12/2004 | Frazee |
| 6,910,053 B1 | 6/2005 | Pauly et al. |
| 6,973,172 B1 | 12/2005 | Bitove et al. |
| 7,006,993 B1 | 2/2006 | Cheong et al. |
| 7,031,693 B2 | 4/2006 | Ohrstrom et al. |
| 7,083,084 B2 | 8/2006 | Graves et al. |
| 7,103,575 B1 | 9/2006 | Linehan |
| 7,106,843 B1 | 9/2006 | Gainsboro et al. |
| 7,131,578 B2 | 11/2006 | Paschini |
| 7,197,662 B2 | 3/2007 | Bullen et al. |
| 7,210,620 B2 | 5/2007 | Jones |
| 7,280,644 B2 | 10/2007 | Tamari et al. |
| 7,333,995 B2 | 2/2008 | Desbiens |
| 7,562,051 B1 | 7/2009 | Donner |
| 7,613,284 B2 | 11/2009 | New |
| 7,630,926 B2 | 12/2009 | Chakiris et al. |
| 2001/0001321 A1 | 5/2001 | Resnick et al. |
| 2002/0008198 A1 | 1/2002 | Kasten et al. |
| 2002/0046122 A1 | 4/2002 | Barber et al. |
| 2002/0077973 A1 | 6/2002 | Ronchi et al. |
| 2002/0138358 A1 | 9/2002 | Scheer |
| 2002/0152124 A1 | 10/2002 | Guzman et al. |
| 2002/0156696 A1 | 10/2002 | Teicher |
| 2002/0165820 A1 | 11/2002 | Anvekar |
| 2002/0174034 A1 | 11/2002 | Au et al. |
| 2002/0188510 A1 | 12/2002 | Arias |
| 2003/0014360 A1 | 1/2003 | Arditti et al. |
| 2003/0020947 A1 | 1/2003 | Brewster et al. |
| 2003/0046231 A1 | 3/2003 | Wu |
| 2003/0046249 A1 | 3/2003 | Wu |
| 2003/0050043 A1 | 3/2003 | Ohrstrom et al. |
| 2003/0095646 A1 | 5/2003 | Paschini |
| 2003/0110104 A1 | 6/2003 | King et al. |
| 2003/0126064 A1 | 7/2003 | Foran |
| 2003/0126075 A1 | 7/2003 | Mascavage, III |
| 2003/0144910 A1 | 7/2003 | Flaherty et al. |
| 2003/0145205 A1 | 7/2003 | Sarcanin |
| 2003/0177028 A1 | 9/2003 | Cooper et al. |
| 2003/0200179 A1 | 10/2003 | Kwan |
| 2003/0236755 A1 | 12/2003 | Dagelet |
| 2004/0010440 A1 | 1/2004 | Lenard et al. |
| 2004/0031847 A1 | 2/2004 | Sorenson et al. |
| 2004/0049598 A1 | 3/2004 | Tucker et al. |
| 2004/0054603 A1 | 3/2004 | Clinesmith et al. |
| 2004/0066228 A1 | 4/2004 | Lennartson et al. |
| 2004/0077334 A1 | 4/2004 | Joyce et al. |
| 2004/0078332 A1 | 4/2004 | Ferguson et al. |
| 2004/0086098 A1 | 5/2004 | Craft |
| 2004/0095604 A1 | 5/2004 | Meyerhofer |
| 2004/0118914 A1 | 6/2004 | Smith et al. |
| 2004/0153410 A1 | 8/2004 | Nootebos et al. |
| 2004/0172367 A1 | 9/2004 | Chavez |
| 2004/0210489 A1 | 10/2004 | Jackson et al. |
| 2004/0218741 A1 | 11/2004 | Welton |
| 2005/0008132 A1 | 1/2005 | Paschini et al. |
| 2005/0114215 A1 | 5/2005 | Tramontano et al. |
| 2005/0123112 A1 | 6/2005 | New et al. |
| 2005/0138127 A1 | 6/2005 | Jain |
| 2005/0229003 A1 | 10/2005 | Paschini et al. |
| 2006/0026073 A1 | 2/2006 | Kenny, Jr. et al. |
| 2006/0043171 A1 | 3/2006 | New et al. |
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |
| 2006/0078100 A1 | 4/2006 | Risafi et al. |
| 2006/0124732 A1 | 6/2006 | Dentlinger |
| 2006/0175394 A1 | 8/2006 | Caven et al. |
| 2006/0248017 A1 | 11/2006 | Koka et al. |
| 2008/0162360 A1 | 7/2008 | Bantz et al. |

FOREIGN PATENT DOCUMENTS

| | | |
|---|---|---|
| JP | 10174009 | 6/1998 |
| JP | 410155040 | 6/1998 |
| JP | 11259576 | 9/1999 |
| WO | WO 9641462 | 12/1996 |
| WO | 9847112 | 10/1998 |
| WO | 0111857 | 2/2001 |
| WO | 03071386 | 8/2003 |

OTHER PUBLICATIONS

U.S. Appl. No. 10/821,815 Non-Final Rejection mailed May 14, 2008.

U.S. Appl. No. 12/573,810 Non-Final Rejection Dec. 21, 2010.

EP Application 05825880 European Extended Search Report mailed Jun. 8, 2011.

U.S. Appl. No. 10/821,815 Non-Final Rejection mailed May 9, 2011.

U.S. Appl. No. 12/786,403 Non-Final Rejection May 12, 2011.

AFX-Asia, FOCUS, Company News, "Tata Hydro-Electric Q2 to Spet net profit 265.8 min rupees vs 212.4", Oct. 28, 1999, pp. 9-9.

Ameritech Corp., "Ameritech debuts its prepaid cellular," Abstract, RCE Radio Communications Report 15, No. 31 (1996), ref. 7, Ameritech & ATM, PINs, or Prepaid Cards. 1994-1997, Lexis/Nexis Database.

Ameritech Corp., et al., "Ameritech in Prepaid Card Venture," Abstract, American Banker CLX, No. 205 (1995), ref. 9, Ameritech & ATM, PINs, or Prepaid Cards. 1994-1997, Lexis/Nexis Database.

Ameritech Corp., et al., "Phone cards meet ATMs," Abstract, Bank Technology News 8, No. 12 (1995), ref. 8, Ameritech & ATM, PINs, or Prepaid Cards. 1994-1997, Lexis/Nexis Database.

Beach et al., Abstract, U.S. Pat No. 5,892,827, Apr. 1999, ref. 7, Catalina Marketing—1994-1997. Lexis/Nexis Database.

Business Wire, Inc., FOCUS, Business Editors, "Easy Wireless Unveils Its Revolutionary Pre-Paid PIN Dispensing KIOSK; Wireless 2000", Feb. 28, 2000, p. 3.

Business Wire, Inc., Focus, Business Editors, "The Winner's Edge.com Announces Purchase Agreement", Nov. 1, 1999, pp. 5-6.

"Card Briefs: Sprint is using EDS for phone-card plan," Abstract, American Banker, Section: Credit/Debit/ATMs; p. 19, (1995), ref. 4, EDS (Electronic Data Systems)—1994-1997. Lexis/Nexis Database.

Derfler, "How Networks Work", Bestseller Edition, 1996, Ziff-Davis Press, Emeryville, CA, all pages.

EP Application 05852818 European Extended Search Report mailed Jan. 22, 2009.

Gill, Lynn A. et al., In Situ Optimization of the Electrode Geometry of the Quadrupole Ion Trap, International Journal of Mass Spectrometry 188 (1999) p. 87-93.

Gralla, "How the Internet Works", Millennium Edition, 1999, Que Corporation, Indianapolis, IN, all pages.

Innovative Telecom Corporation, Abstract, "Innovative Telecom Corporation Receives Contacts from NYNEX t Provide Prepaid Phone Card Services," PR Newswire, (1995) Section: Financial News, ref. 4, Innovative Telecom—1994-1997. Lexis/Nexis Database.

"Innovative Telecom Corp., and Catalina Marketing Corporation to Make Prepaid Long Distance Certificates Available to 120 Million Shoppers," Abstract, PR Newswire, (1995), Section: Financial News; ref. 4, Catalina Marketing—1994-1997. Lexis/Nexis Database.

Knowles, Francine, "ATMs to Dispense Calling Cards; Ameritech, Cash Station in Venture," Abstract, Financial Section, Chicago Sun-Times, Oct. 18, 1995, ref. 1, Ameritech & ATM, PINs, or Prepaid Cards. 1994-1997. Lexis/Nexis Database.

"Loose Change," Abstract, U.S. Banker (1995), National Edition, Section USB News; Industry, p. 12, ref. 1, EDS (Electronic Data Systems)—1994-1997, Lexis/Nexis Database.

Marcous, et al., Abstract, U.S. Pat. No. 5,650,604, Jul. 1997, Electronic Data Systems Corp., ref. 10, EDS (Electronic Data Systems)—1994-1997. Lexis/Nexis Database.

Mexican Patent Application MX/a/2007/006924 Office Action dated Jul. 28, 2010.

Muller, "Desktop Encyclopedia of the Internet", 1999, Artech House Inc., Norwood, MA, all pages.

"Outsourcing the ATM business," Abstract, Electronic Payments International No. 102 (1995): 6; ref. 5, EDS (Electronic Data Systems)—1994-1997. Lexis/Nexis Database.

PCT/US04/15658 IPRP, ISR and written opinion mailed Jun. 22, 2005.

PCT/US05/43756 IPRP, ISR and Written Opinion mailed Oct. 3, 2006.

PCT/US05/43705 IPRP, ISR and Written Opinion mailed Aug. 10, 2006.

Piskora, Bth, "EDS inroads into ATMs," Abstract, American Banker (1995): 18:1, ref. 8 EDS (Electronic Data Systems) 1994-1997. Lexis/Nexis Database.

Qcomm International, Inc. Website—Oxpress Prepaid Services Pont-of-Sale Activation (2000).

Splendore, Maurizio et al., A New Ion Ejection Method Employing and Asymmetric Trapping Field to Improve the Mass Scanning Performance of an Electrodynamic Ion Trap, International Journal of Mass Spectrometry 190/191 (1999), p. 129-143.

U.S. Appl. No. 10/316,603 Non-Final Rejection mailed Sep. 15, 2005.

U.S. Appl. No. 10/316,603 Non-Final Rejection mailed Jun. 20, 2006.

U.S. Appl. No. 10/316,603 Non-Final Rejection mailed May 21, 2007.

U.S. Appl. No. 10/316,603 Final Rejection mailed Aug. 15, 2008.

U.S. Appl. No. 10/316,603 Notice of Allowance mailed Dec. 9, 2008.

U.S. Appl. No. 10/821,405 Non-Final Rejection mailed Jan. 14, 2009.

U.S. Appl. No. 10/821,405 Final Rejection mailed Nov. 23, 2009.

U.S. Appl. No. 10/821,815 Final Rejection mailed Feb. 4, 2009.

U.S. Appl. No. 10/821,815 Non-Final Rejection mailed Aug. 5, 2009.

U.S. Appl. No. 10/821,815 Non-Final Rejection mailed Jun. 19, 2010.

U.S. Appl. No. 10/821,815 Non-Final Rejection mailed Aug. 4, 2010.

U.S. Appl. No. 11/007,663 Non-Final Rejection mailed Jun. 12, 2008.

U.S. Appl. No. 11/007,663 Ex Party Quale mailed Jul. 16, 2009.

U.S. Appl. No. 11/007,663 Notice of Allowance Oct. 30, 2009.

U.S. Appl. No. 10/846,529 Notice of Allowance mailed Jul. 27, 2005.

U.S. Appl. No. 10/925,218 Non-Final Rejection mailed Oct. 4, 2005.

U.S. Appl. No. 10/925,218 Non-Final Rejection mailed Jun. 14, 2006.

U.S. Appl. No. 10/984,363 Non-Final Rejection mailed Sep. 22, 2006.

U.S. Appl. No. 10/984,363 Final Rejection mailed Apr. 17, 2007.

U.S. Appl. No. 11/552,915 Non-Final Rejection mailed May 25, 2010.

U.S. Appl. No. 11/939,327 Non-Final Rejection mailed Sep. 19, 2008.

U.S. Appl. No. 11/939,327 Notice of Allowance mailed Jun. 19, 2009.

U.S. Appl. No. 11/007,662 Non-Final Rejection mailed Jul. 14, 2006.

U.S. Appl. No. 11/007,662 Notice of Allowance mailed Jun. 6, 2007.

U.S. Appl. No. 11/851,337 Notice of Allowance Sep. 9, 2008.

U.S. West Communications, Abstract, "US West Launches Christmas Prepaid Calling Card With Card Pioneer Innovative Telecom; - Sixty Minute Holiday Card Available Now -," PR Newswire, (1997) Section: Financial News, ref. 1, Innovative Telecom—1994-1997. Lexis/Nexis Database.

VENDAPIN Website—www.vendapin.com/5008.html, "VENDAPIN Model 5004 Four Selection Cellular and IP, Phone Calling Card, Lottery or Admissions Ticket Printer Vending Machine With Optional Two Selection Cellular Phone Dispenser Console", Apr. 3, 2000, pp. 1-4.

White, "How Computers Work", Millennium Edition, 1999, Que Corporation, Indianapolis, IN, all pages.

www.carkleen.co.nz/Products/Codax "Codax Activation System" Car Kleen—Leaders in Vehicle Wash Technology.

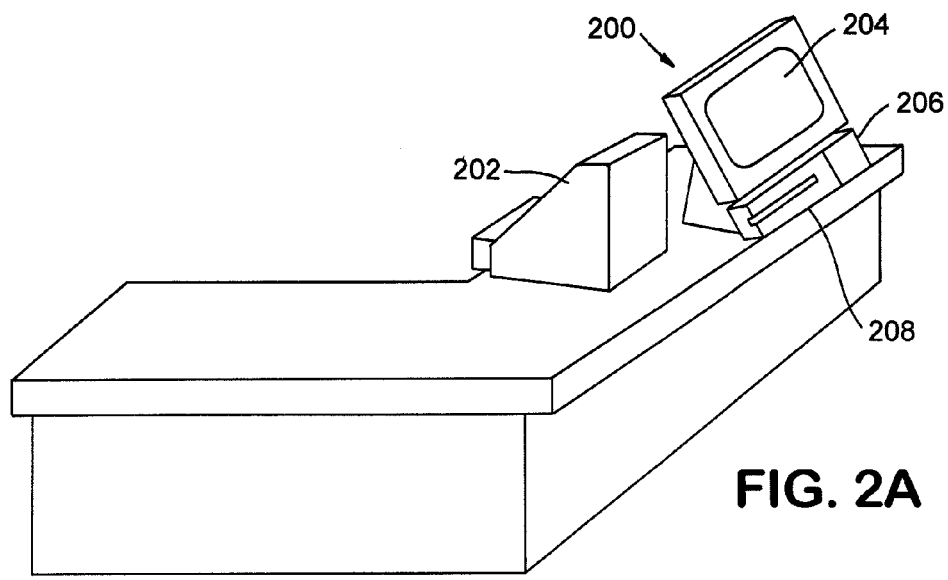
FIG. 2A
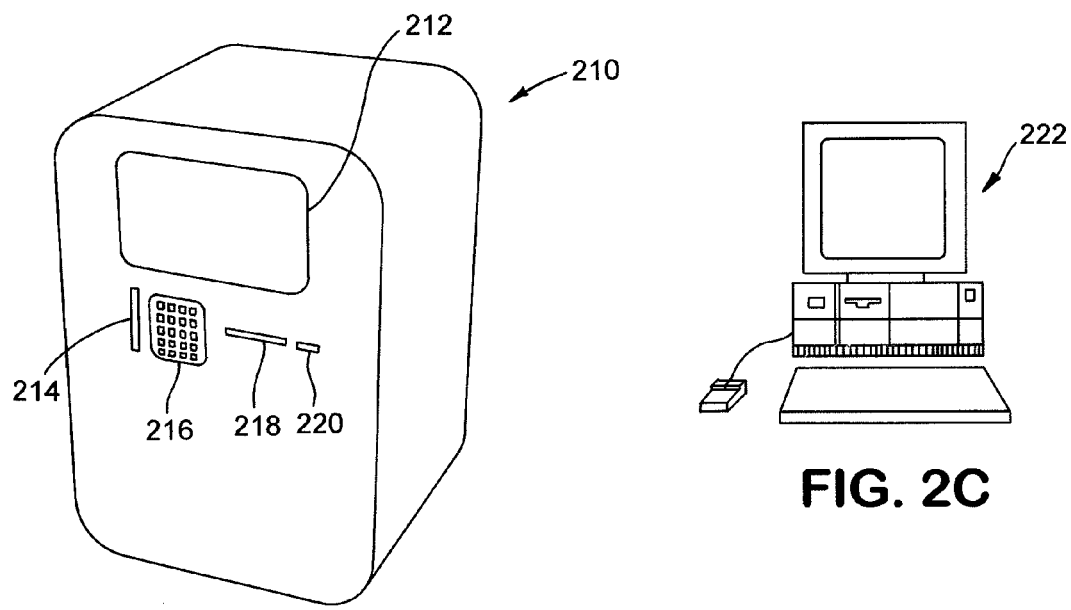
FIG. 2B
FIG. 2C

| | 301 GOOD/SERVICE | 302 PROVIDER | 304 $ VALUE | 306 PIN | 308 RATE | 310 EXPIRATION | 320 SALE DATE/TIME |
|---|---|---|---|---|---|---|---|
| | \multicolumn{7}{c}{PIN DATABASE 112} | | | | | | |
| 312a | Cellular Service | AT&T | $15 | 3456234523 | $0.60/min | 1 month | |
| 312b | Cellular Service | AT&T | $15 | 2830525950 | $0.60/min | 1 month | |
| 312c | Cellular Service | AT&T | $15 | 9823459754 | $0.60/min | 1 month | |
| 312d | Cellular Service | AT&T | $30 | 4575626584 | $0.50/min | 6 months | |
| 312e | Cellular Service | AT&T | $30 | 2894754598 | $0.50/min | 6 months | |
| | ... | ... | ... | ... | ... | ... | ... |
| 312f | Cellular Service | AIRTOUCH | $50 | 0948574995 | $0.40/min | 1 year | |
| 312g | Cellular Service | AIRTOUCH | $50 | 9087423543 | $0.40/min | 1 year | |
| 312h | Cellular Service | AIRTOUCH | $50 | 1358909658 | $0.40/min | 1 year | |
| 312i | Cellular Service | AIRTOUCH | $100 | 8759187405 | $0.35/min | 1 year | |
| 312j | Cellular Service | AIRTOUCH | $100 | 8648767465 | $0.35/min | 1 year | |
| 312k | Cellular Service | AIRTOUCH | $100 | 3245105748 | $0.35/min | 1 year | |
| | ... | ... | ... | ... | ... | ... | ... |
| 312l | Cellular Service | SPRINT | $25 | 8275098427 | $0.55/min | 6 months | |
| 312m | Cellular Service | SPRINT | $25 | 0987451455 | $0.55/min | 6 months | |
| 312n | Cellular Service | SPRINT | $50 | 1234870987 | $0.39/min | 6 months | |
| 312o | Cellular Service | SPRINT | $50 | 8765230058 | $0.39/min | 6 months | |
| 312p | Cellular Service | SPRINT | $100 | 4545454892 | $0.36/min | 6 months | |
| | ... | ... | ... | ... | ... | ... | ... |
| 312q | Gasoline | MOBIL | $100 | 1231283950 | Pump Rate | 1 year | |
| 312r | Gasoline | MOBIL | $100 | 3458432349 | Pump Rate | 1 year | |

FIG. 3

PrePaid Airtime Purchase Ordering System

Username:     ▭ ─1302

Password:     ▭ ─1304

▭ ─1306

© 2000 by Powered By Easy Wireless, Inc.
http://www.easywireless.com

Purchase Ordering Model

Purchase Order Data Entry

| Dealer Information: | Payment Method: | Current Balance: |
|---|---|---|
| ABC Communications<br>123 ABC St.,<br>San Diego, CA 91941 | Credit Card: Visa<br>Exp: 02/2002<br>Cardholder Name: John Doe | None |

| Carrier | Region | Card Type | Qty | Wholesale | Totals | Add/Del |
|---|---|---|---|---|---|---|
| Verizon Wireless | Northwest | $30 Card | 5 | $ 25.00 | $ 250.00 | |
| <Select Carrier> | <Select Region> | <Select Card> | 1 | $ --.-- | $ --.-- | |
| | | | | Grand Total: | $ 250.00 | |

Instructions

1) Select a Carrier, Region, Card Type then Enter a Quantity.
2) Confirm your line item by clicking "ADD" at the end of the line.
3) Repeat the process until all the PINs that you wish to purchase are listed.
4) Click "Continue To Summary Screen" to review your order and payment methods.

You *must* click ADD to buy a line item.

To Remove a Line Item: Click "DEL" on the line item you wish to remove.

To Change a Quantity: Change the quantity field to the desired amount, then click "Update Order".

To Cancel the Entire Order: Click "Cancel Order".

If you are having any problems with the system, please send an email to prepaidservice@easywireless.com with a brief description of your problem.

See Next Screen

FIG. 14

Purchase Order Summary

| Dealer Information: | Payment Method: | Current Balance: |
|---|---|---|
| ABC Communications<br>123 ABC St.<br>San Diego, CA 91941 | ACH Maxium:<br>$2,000<br>ACH Min Refresh:<br>$200 | $ 1,000 |

Account Response Window
Previous Balance: $ 1000.00
Amount of Purchase Order: $ 240.00
New Balance: $ 760.00

Purchase Order Summary:

Please review your Purchase Order. If satisfactory, "Submit PO" and your order will be processed and your account charged.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|  |  |  |  |  | Grand Total: | $ 240.00 |

1502  1508  1504  1506

If you are having any problems with the system, please send an email to prepaidservice@easywireless.com with a brief description of your problem.

View Alternate Payment Page | View Print Screen

FIG. 15

Purchase Order Summary

Alternate Credit Card Payment Screen
Please Fill In All Fields. Billing Address must match CardHolder name.

Billing Information

Cardholder Name: ☐

Address Line 1: ☐

Address Line 2: ☐

City: ☐

State/Province: ☐

Zip Code: ☐

Credit Card Type: [MasterCard]

Expiration: Month [01] - Year [2000]

Credit Card Number: ☐

Purchase Order Summary:

Please review your Purchase Order. After you submit this order, the following screen will display your PINS and allow you to print them from your browser.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
| | | | | | Grand Total: | $ 240.00 |

FIG. 16

Purchase Receipt Summary

Thank You For Your Purchase!

PRINT THIS PAGE IMMEDIATELY FOR YOUR RECORDS.
A copy of this receipt WITHOUT PINS will be emailed to your account for your records.

Purchase Order Summary
Dealer Name: XYZ Wireless
Dealer ID: 515432
Payment Type Used: ACH
Previous Account Balance: $ 1,000.00
Total Amount of Purchase Order: $ 390.00
New Balance: *$ 610.00*
Transaction Date: 02/15/2000
Transaction Number: 1554987745234

The following list of PINS were purchased:

| Carrier | Region | Card Type | PINS |
|---|---|---|---|
| MCI | Region ABC | $ 5 Card | 2165498465132132 |
| MCI | Region ABC | $ 5 Card | 9815654198510522 |
| MCI | Region ABC | $ 5 Card | 6851096519865241 |
| MCI | Region ABC | $ 5 Card | 9854103541524854 |
| MCI | Region ABC | $ 5 Card | 9651068352741551 |
| MCI | Region XYZ | $ 30 Card | 1321319849515216 |
| MCI | Region XYZ | $ 30 Card | 9541687418524156 |
| MCI | Region XYZ | $ 30 Card | 3249864138787496 |
| AT&T Wireless | Los Angeles, CA | $ 50 Card | 2165165165135165 |
| AT&T Wireless | Los Angeles, CA | $ 100 Card | 8546165165165165 |
| AT&T Wireless | Los Angeles, CA | $ 100 Card | 3549818743184945 |
| Verizon | Louisville, KY | $ 5 Card | 9816519819851565 |
| Verizon | Louisville, KY | $ 5 Card | 6549806541635241 |
| Verizon | Louisville, KY | $ 5 Card | 8541216854210556 |
| Verizon | Louisville, KY | $ 5 Card | 1354135054198604 |
| Verizon | Louisville, KY | $ 5 Card | 8754040567418653 |

If you are having any problems with the system, please send an email to prepaidservice@easywireless.com with a brief description of your problem.

FIG. 17

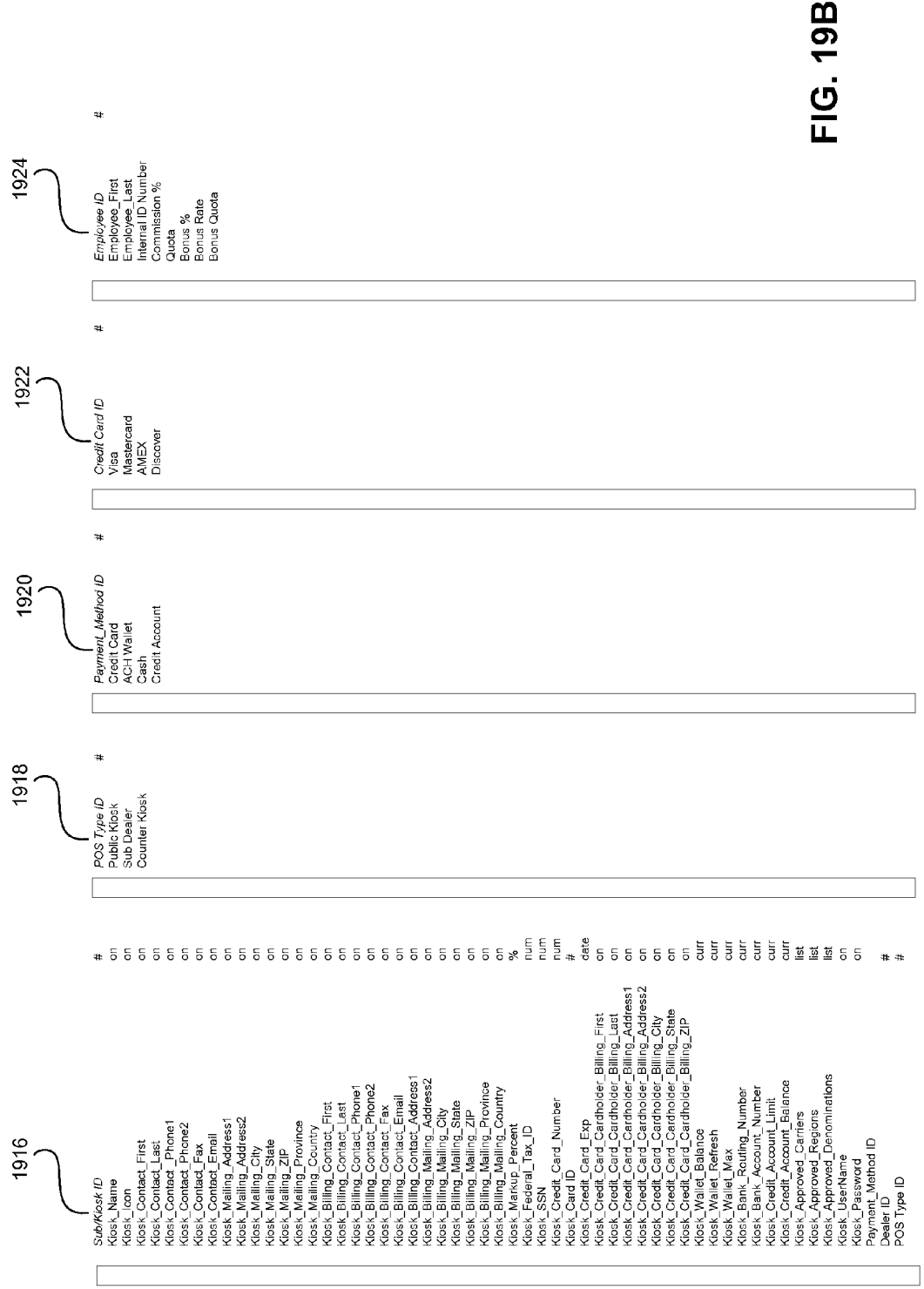

SYSTEMS AND METHODS FOR PERSONAL IDENTIFICATION NUMBER DISTRIBUTION AND DELIVERY

CROSS-REFERENCE TO RELATED APPLICATIONS

This application is a continuation of and claims priority to U.S. patent application Ser. No. 11/007,663, filed Dec. 7, 2004, now U.S. Pat. No. 7,676,030, entitled SYSTEM AND METHOD FOR PERSONAL IDENTIFICATION NUMBER DISTRIBUTION AND DELIVERY, and is a continuation-in-part of and claims priority to U.S. patent application Ser. No. 10/316,603, entitled SYSTEM AND METHOD FOR DISTRIBUTING PERSONAL IDENTIFICATION NUMBERS OVER A COMPUTER NETWORK, filed Dec. 10, 2002, now U.S. Pat. No. 7,522,716, which is a continuation of U.S. patent application Ser. No. 09/619,392, filed Jul. 19, 2000, now U.S. Pat. No. 6,526,130, all of which are hereby incorporated by reference in their entirety. This application is also related to co-pending U.S. patent application Ser. No. 10/821,405, entitled SYSTEM AND METHOD FOR DISTRIBUTING PERSONAL IDENTIFICATION NUMBERS OVER A COMPUTER NETWORK, filed on Apr. 9, 2009, and U.S. application Ser. No. 10/821/815 entitled SYSTEM AND METHOD FOR DISTRIBUTING PERSONAL IDENTIFICATION NUMBERS OVER A COMPUTER NETWORK, filed on Apr. 9, 2004, which are hereby incorporated by reference in their entirety.

FIELD OF THE INVENTION

The present invention generally relates to a system and method for distributing personal identification numbers (PINs) for access to pre-paid goods and/or services to users over a computer network. More specifically, but not exclusively, the present invention relates to systems and methods for distributing a supply of PINs among a centralized server and plural distribution client terminals through which the PINs may be vended.

BACKGROUND

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material, which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs $4, MCI will debit the account so that $6 remains. The next time the customer places a call using that PIN number, the system will find that $6 remains in the account associated with that PIN.

One problem with these pre-paid phone cards is that the cards are required to be carried as inventory by dealers. There is substantial work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers, which sell these cards, are extremely vulnerable to inventory shrinkage.

Vending card machines have been proposed which store personal identification numbers (PINs) in a memory in the machine. A customer can then purchase a pre-paid telephone PIN by inserting cash into the machine. The machine can replenish its stock of PINs when the memory runs out of PINs or on a periodic basis by accessing a remote store of PINs via a modem.

One problem with these vending machines is that there are still significant costs associated with inventorying the PINs. The PINs are retained in a memory in the machine, which has a similar effect to storing cards. Once a PIN has been stored in the memory of a particular machine, that PIN becomes unavailable to be used by any other dealer, even if the PIN is never purchased. Additionally, if the machine was to break, or the memory was to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

Another proposed system is based upon a web site accessed over the Internet. A customer can go to this web site and purchase pre-paid telephone service. A PIN is then e-mailed to the customer's e-mail address. One disadvantage of this service is that a customer must be able to access his or her e-mail account in order to obtain the PIN. Additionally, e-mail is often unsecure. If a computer hacker is "listening in" on an individual's email, then the hacker can steal the PIN and use it for his own purposes. Additionally, if a customer is purchasing a PIN in a convenience store or an airport, the customer will probably not have access to his or her e-mail account. The customer may have to wait to return to his or her home or office to access the PIN. Additionally, e-mail can sometimes be slow and it may take hours or days to retrieve the message from the customers Internet Service Provider (ISP).

A system which overcomes the primary disadvantages of the systems referenced above is described in the above-referenced U.S. application Ser. No. 10/316,603, now U.S. Pat. No. 7,522,716 which is assigned to the assignee of the present invention. This application describes a system and method for providing a personal identification number (PIN) to a client terminal over a computer network. The described system and method eliminates all costs associated with filled inventory for dealers selling PINs. For example, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request. No inventory of PINs is stored at the client terminal. All transmissions between the client terminal and the server are by secure transmission to prevent an eavesdropper from stealing the PIN(s).

Upon or prior to receipt of the PIN at the client terminal, the user is prompted to enter payment at the terminal for the requested PIN. After the user pays for one or more PINs, the client terminal prints a receipt for the customer, the receipt including the requested PIN number and instructions for using the PIN. The PIN can be used for accessing pre-paid telephone service. Alternatively, the PIN can be used for accessing other pre-paid goods and services such as gasoline, magazines, subway service, etc.

Although the system described in the above-described application provides numerous advantages, in many implementations a telephone call is required to be placed from the client terminal to the server in connection with the purchase and dispensing of each PIN. Unfortunately, the telecommunications charges resulting from such calls tend to increase the cost of operating the system.

SUMMARY

In summary, the present invention generally relates to a method of obtaining a personal identification number (PIN) from a client terminal. In one aspect the method includes storing, within a cache at the client terminal, PINs for plural prepaid services. The method further includes receiving, at the client terminal, a request for a PIN associated with a desired prepaid service. If the desired prepaid service corresponds to one of the plural prepaid services for which one or more PINs are stored at the client terminal, one or more of these stored PINs are dispensed in response to the PIN request. On the other hand, when the desired prepaid service does not correspond to one of the plural prepaid services, a PIN request is sent from the client terminal to a server. In response, at least a requested PIN associated with the desired prepaid service is downloaded from the server, received at the client terminal, and dispensed. Additional PINs may also be downloaded, separately or with the requested PIN, in order to replenish the supply of PINs for the plural prepaid services maintained within the cache.

The present invention also pertains to a client terminal which includes a processor and a first interface. The first interface is disposed to receive a first request for a PIN associated with a first desired prepaid service and a second request for a PIN associated with a second desired prepaid service. The client terminal also includes memory, operatively coupled to the processor, which contains instructions of an application program executed by the processor. The memory also caches at least a first requested PIN associated with the first desired prepaid service. A dispensing mechanism functions to dispense, under the control of the application program, the first requested PIN in response to the first request for a PIN. The client terminal further includes a second interface through which is transmitted, to a server, a PIN request generated by the application program when the application program determines that at least one PIN associated with the second desired prepaid service is not cached within the memory. The dispensing mechanism is further configured to dispense, under the control of the application program and in response to receipt of the second request for a PIN, a second requested PIN associated with the second desired prepaid service wherein the second requested PIN is received through the second interface.

In another aspect the present invention relates to a system for delivering personal identification numbers (PINs) to client terminals. The system includes a server containing a processor and memory operatively coupled to the processor. The system also includes a database in communication with the server. The database contains: (i) plurality of sets of PINs associated with a corresponding plurality of prepaid services, and (ii) a set of records wherein each of the records includes information identifying ones of the plurality of prepaid services for which one of the client terminals is disposed to store plural PINs. The processor executes instructions stored in the memory for sending, to a first of the client terminals from which a PIN request corresponding to one of the plurality of prepaid services is received, at least one PIN associated with the one of the plurality of prepaid services.

The present invention also relates to a method of obtaining a personal identification number (PIN) from a client terminal. The method includes storing, at the client terminal, PINs for plural prepaid services. The method also includes receiving, at the client terminal, a request for a PIN associated with a desired prepaid service corresponding to one of the plural prepaid services. A PIN request is then sent, from the client terminal, to a server when less than a predefined number of PINs associated with the desired prepaid service are stored at the client terminal. In response, one or more PINs associated with the desired prepaid service are received at the client terminal. The method further includes dispensing at least one PIN corresponding to the desired prepaid service from the client terminal.

Additional aspects of the present invention are further described below in conjunction with the appended drawings.

BRIEF DESCRIPTION OF THE DRAWINGS

For a better understanding of the nature of the features of the invention, reference should be made to the following detailed description taken in conjunction with the accompanying drawings, in which:

FIG. 2A depicts a picture of a dealer-located embodiment of a client terminal;

FIG. 2B depicts an automated kiosk embodiment of a client terminal;

FIG. 2C depicts a personal computer embodiment of a client terminal;

FIG. 3 depicts a simplified example of a database record;

FIG. 14 depicts an example of a display screen shown to a user for entering data into a purchase order;

FIG. 15 depicts an example of a purchase order summary screen;

FIG. 16 depicts an example of a screen shown to a user for entering alternate credit card information;

FIG. 17 depicts an example of a purchase receipt summary screen for the purchase ordering system;

FIGS. 19A and 19B show an example of a more detailed database record;

DETAILED DESCRIPTION OF EMBODIMENTS

Figure 1:
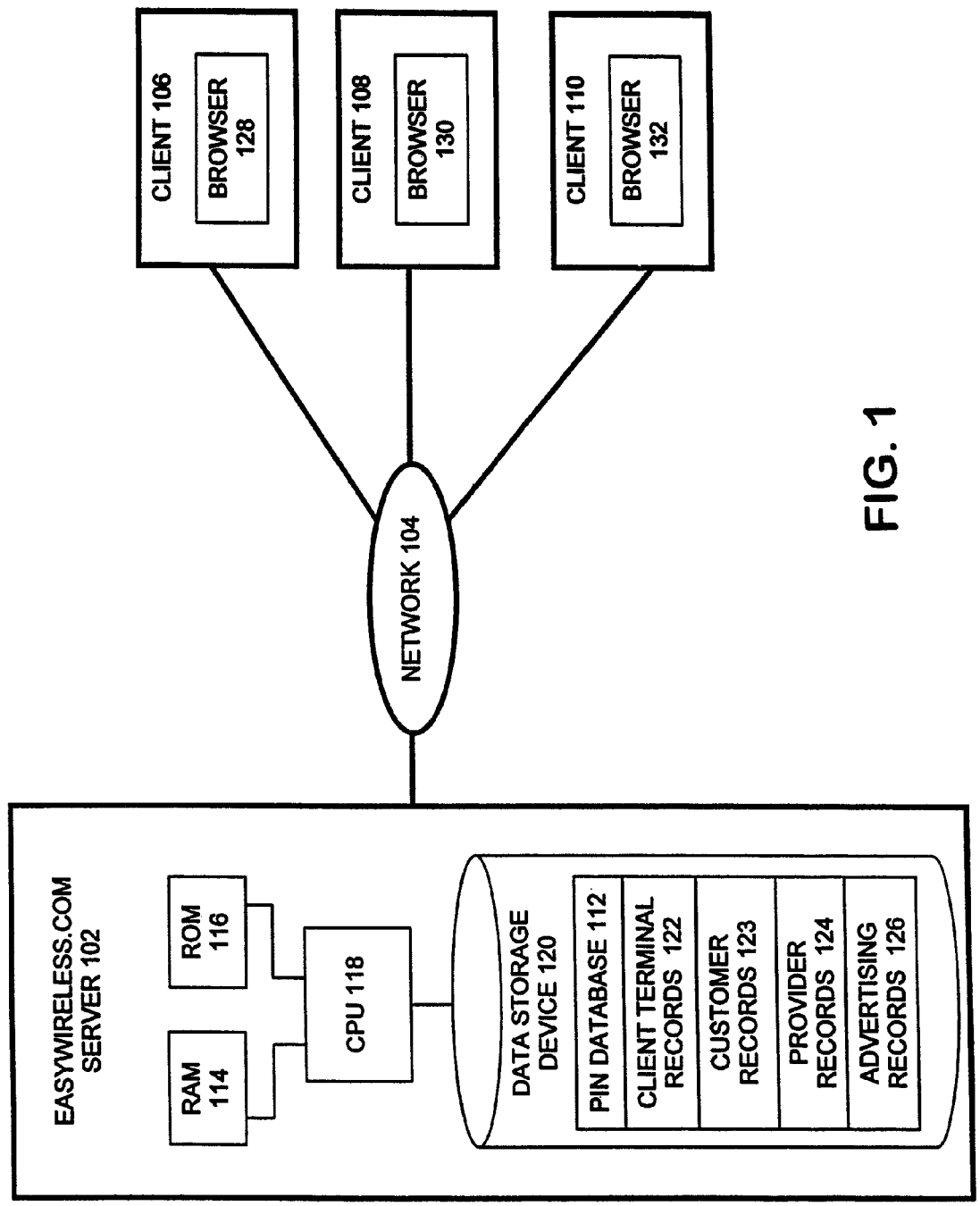
FIG. 1 depicts a block diagram of a system architecture suitable for implementing a method of distributing PINS.

The present invention provides a system and method for efficiently distributing the supply of PINs among a centralized server and plural distribution terminals through which the PINs are vended. Consistent with one aspect of the invention, the centralized server maintains a database record for each terminal indicating for which prepaid products PINs may be "pre-stored" within the terminal for such product. In one implementation a "high-water mark" indicative of the number of prepaid PINs capable of being pre-stored by the terminal is specified on its record with respect to each product.

As is described in further detail below, a transaction is initiated at a given terminal in response, for example, to selection of a product via a menu displayed on the terminal. At this point the terminal checks to see if any prepaid PINs corresponding to the selected prepaid product have been pre-stored on the terminal. If so, one of the pre-stored PINs is used for the sale and printed by the terminal upon a receipt. Otherwise, the terminal contacts the server and requests a PIN for the selected prepaid product. If the selected prepaid product is characterized within the server by a non-zero high-water mark, then at least one corresponding PIN is downloaded from the server to the terminal. The first of these PINs is sold to the consumer, and any remaining PINs also downloaded are stored locally on the terminal.

The present invention may be best understood in light of the subject matter of the above-referenced co-pending U.S. application Ser. No. 10/316,603, which is described herein with reference to FIGS. 1-19 and incorporated by reference. As one of ordinary skill in the art will recognize, many of the aspects of the systems and methods described with reference to FIGS. 1-19 are pertinent to the embodiments of the present invention described further below.

This co-pending application describes a system and method which allows purchase of pre-paid amounts of any good or service, such as telephone service, gasoline, electricity, dry-cleaning, bus service, subway service, magazines, newspapers, or bundled goods and services. After purchase of a pre-paid amount of a good or service, a client terminal receives a personal identification number (PIN), which is downloaded in real-time over a network. The PIN is provided over the network "on-demand," meaning that the PIN is downloaded over the network immediately or very soon after receiving a request and payment for the PIN. The PIN is downloaded over a network in response to the request, not delivered to the client terminal hours or days after the request. The PIN is not stored locally at the client terminal (typically operated by a dealer), but is downloaded over the network (e.g., a public network such as the Internet or the public switched telephone network), thus eliminating any inventory tasks or costs associated with maintaining a filled inventory for the dealer. After the PIN is received at the client terminal and it is dispensed to an end user, it may be used at any convenient time to access the desired good or service.

The above-identified co-pending application thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Because the PINs are delivered on-demand, there is a real-time distribution and accounting. Additionally, there is an elimination of the inventory shrinkage problem created by the loss, and theft of pre-paid cards.

Moreover, the above-identified co-pending application describes a system and method for providing a personal identification number (PIN) to a client terminal over a computer network. The described system and method eliminates all costs associated with filled inventory for dealers selling PINs.

For example, a server receives a request for a PIN over a network, the request originating from a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the request from the client terminal. No inventory of PINs is stored at the client terminal. All transmissions between the client terminal and the server are by secure transmission to prevent an eavesdropper from stealing the PIN(s).

Once dispensed to the end user by the client terminal, the PIN can be used for accessing pre-paid telephone service. Alternatively, the PIN can be used for accessing other pre-paid goods and services such as gasoline, magazines, subway service, etc.

The server can transmit to the client terminal a plurality of products or services available. The server then receives from the client terminal a selection of one of the available products or services. The server transmits to the client terminal a plurality of provider names for the requested product or service. The server receives from the client terminal the selection of one of the available provider names. The server transmits to the client terminal a plurality of monetary denominations available for the requested provider. The server receives from the client terminal a selection of one of the available monetary denominations. The server transits to the client terminal a plurality of regions available for the requested provider. The server receives from the client terminal a selection of the one of the available regions. The server can receive a request from the client terminal to view rate information. The server then transmits rate information to the client terminal.

The user of the client terminal (e.g., a dealer) is then prompted to enter payment for the requested PIN. The user may enter payment by a) inserting cash into a receptacle at the client terminal, or b) entering credit card or debit card or smart card information or swiping the card of an end user of the requested PIN through a receptacle. If an end user pays a dealer for the requested PIN, then settlement with the operator of the server may occur in a number of ways. For example, the dealer may remit a portion of the payment to an account associated with the server by a) transferring funds from a dealer's account into the account associated with the server by an electronic funds transfer, or b) charging a portion of the payment to a dealer's credit account, or c) charging a portion of the payment to a dealer's credit card.

After payment for one or more PINs has been made, the client terminal prints a receipt for the end user, the receipt including the requested PIN number and instructions for using the PIN. Additionally, a purchase ordering method is described in the above-identified pending application whereby a dealer can buy PINs in bulk and receive a wholesale discount. The dealer can place multiple individual purchase orders at once, each individual purchase order associated with a requested provider, a requested monetary denomination, and a requested number of PINs.

The system of the above-identified co-pending application allows purchase of pre-paid amounts of any good or service, such as telephone service, gasoline, electricity, dry-cleaning, bus service, subway service, magazines, newspapers, or bundled goods and services. After purchase of a pre-paid amount of a good or service, the client terminal receives a personal identification number (PIN), which is downloaded in real-time over a network. The PIN is provided over the network "on-demand," meaning that the PIN is downloaded over the network immediately or very soon after receiving a request and payment for the PIN. The PIN is downloaded over a network by the server in response to the received request, and not delivered to the client terminal hours or days after the request. The PIN is not stored locally at the client terminal, but is downloaded over a network, thus eliminating any inventory tasks or costs associated with maintaining a filled inventory for the dealer. After the PIN has been dispensed by the client terminal to the end user, the PIN may be used at any convenient time to access the desired good or service.

FIG. 1 depicts a block diagram of a system for distributing PIN numbers. PIN server 102 is coupled to network 104. Server 102 can be any large computer or network device. Network 104 can be any network connecting computers such as the Internet. Client terminals 106, 108, and 110 are running browser programs 128, 130 and 132, respectively. Browsers 128, 130, and 132 are any program that allows client terminals 106, 108, and 110 to access PIN server 102 over network 104.

PIN server 102 contains RAM 114, ROM 116, CPU 118, and data storage device 120. CPU 188 runs the software, which is operating the method depicted in FIG. 4. Data storage device 120 contains a personal identification number (PIN) database 112. PIN database 112 stores PINs, which are available for purchase. The PIN provides access to a pre-paid amount of a good or a service. PIN database 112 is described in more detail with respect to FIG. 3.

Data storage device 120 also includes client terminal records 122. Client terminal records store information concerning where client terminals are located. Client terminal records 122 can store any information specific to specific client terminals, such as previous purchase history, payment and account information, and terminal preferences.

Data storage device also includes customer records 123. Customer records 123 provide information unique to individual customers. For example, as will be discussed later with respect to FIG. 2C, customers can access PIN server 102 through a home personal computer. Customers can identify themselves and provide identifying information. PIN server 102 can use this information to provide better service to the customer, to target advertising to the customer, or to store payment or credit accounts. When a customer accesses PIN server 102 from a client terminal in a retail store, in most instances the customer will prefer to remain anonymous. In this case, PIN server 102 will not store any customer information in customer records 123.

Data storage device 120 also contains provider records 124. These records contain information pertinent to providers who are providing PINs for PIN database 112. For example, these records can contain addresses, billing information, and telephone numbers. Data storage device 120 also contains advertising records 126. Advertising records 126 contain information about advertising banners and links that can be provided to client terminals 106, 108 and 110 as an additional source of revenue.

Because the PINs are valuable and could be subject to theft and copying by electronic piracy, communications network 104 between PIN server 102 and client terminals 106, 108 and 110 is protected by the use of encrypted communications and well-known security techniques. Client terminals 106, 108, and 110 can provide security certificates to PIN server 102 to authenticate their transmissions.

FIGS. 2A-2C depict three alternative physical embodiments of client terminals 106, 108 and 110. FIG. 2A depicts a physical embodiment, which is used in a typical checkout counter of a store, such as a convenience store. Client terminal 200 of this embodiment includes a touch-screen 204. Various options appear on touch-screen 204, which a customer may activate by touching an appropriate location on touch-screen 204. A customer makes payment by paying cash to a store clerk operating cash register 202. Alternatively, a customer can pay with a credit card by swiping a credit card through credit card slot 208. Buttons 206 can be used by the customer in addition to touch-screen 204 to make additional selections, such as choosing a particular type of credit card.

FIG. 2B depicts an alternative physical embodiment for the client terminal, automated kiosk 210. Automated kiosk 210 includes a touch-screen 212. Credit card receptor 214 allows a consumer to submit payment by inserting a credit card. Alternatively, the customer can insert bills into bill receptor 218, or coins into coin receptor 220. The customer can optionally make selections by entering data on keypad 216 in addition to making selections with touch-screen 212.

FIG. 2C depicts another alternative physical embodiment for a client terminal. Personal computer 222 can be used in the convenience of a customer's home or office to access the PIN server 102, by entering an appropriate URL in the customer's browser. The customer can then purchase PIN(s) from the PIN server 102 from the customer's personal computer 222.

FIG. 3 depicts a simplified example of records within PIN database 112. Another, more detailed example of records within PIN database 112 is described later with respect to FIGS. 19A and 19B. PIN database 112 stores PINs, which are available for purchase by customers. PIN database 112 contains records 312. Good/Service field 301 specifies the name of a good or service, which is available for pre-paid purchase. For example, records 312a-312p shown in FIG. 3 contain PINs, which provide access to pre-paid cellular service. Records 312q-r shown in FIG. 3 contain PINs, which provide access to pre-paid gasoline. Other goods and services can be also be included in PIN database 112 such as electricity, cable service, satellite TV, etc.

Provider field 302 contains the name of the particular good or service provider associated with the record. For example, FIG. 3 shows records for AT&T, AIRTOUCH, SPRINT, and MOBIL. Value field 304 specifies the dollar value associated with each record. For example, record 312h provides a customer with $50 of pre-paid cellular service from AIRTOUCH. PIN field 306 specifies the PIN, which is provided to the customer and allows access to the good or service. Rate field 308 specifies a rate associated for each record. For example, for cellular telephone service rate field 308 specifies the calling rate associated with the record. In the example PIN database 112 shown in FIG. 3, rate field 308 is not used for gasoline records 312q and 312r, since the gasoline rate is determined at the pump.

Expiration field 310 contains an expiration date beyond which the PIN for that record will no longer be valid. Other fields may also be added. Some fields may be particular to a specific good or service. For example, if gasoline is being sold then there may be a field for "Octane" which specifies the octane level of gasoline being purchased. Finally, sale date/time field 320 contains the date and time at which the PIN represented by the applicable record 312 was actually sold to an end-user.

Figure 4A:
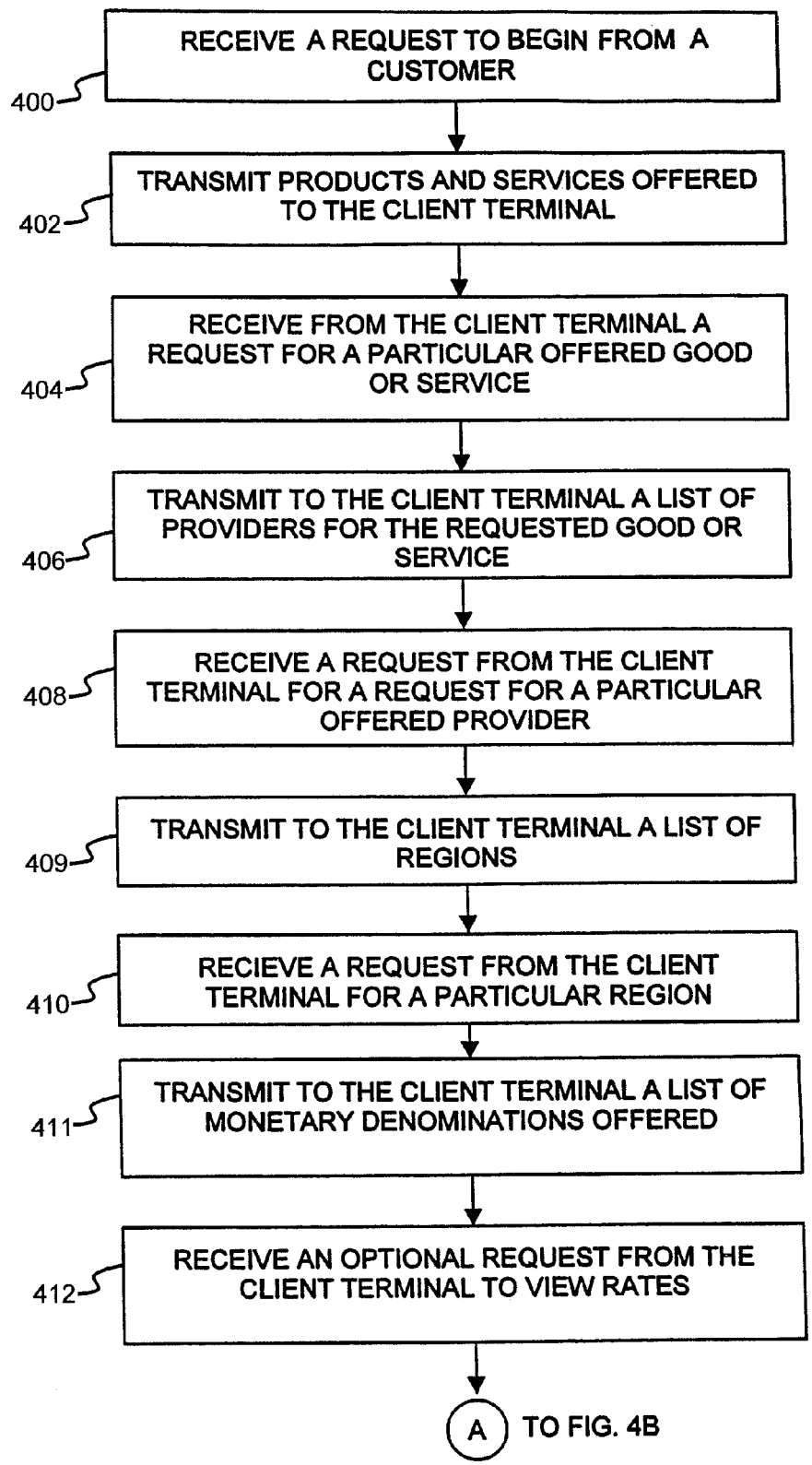
FIGS. 4A and 4B depict a flowchart illustrating a method of purchasing one or more PINs.
Figure 4B:
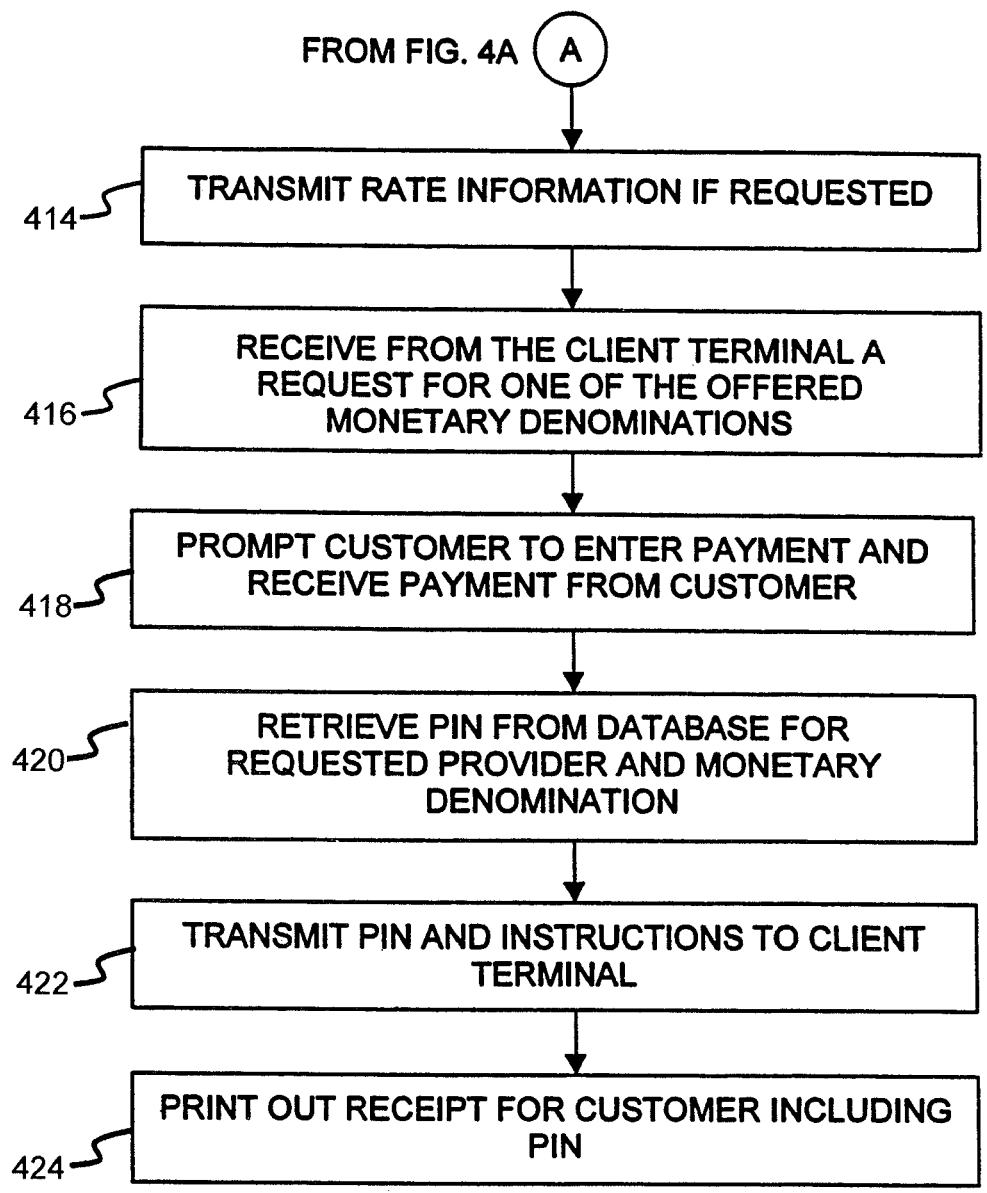

FIG. 4A depicts a flowchart illustrating a method of operating PIN server 102. Initially, in stage 400, the PIN server receives a request from a customer to begin. For example, a customer entering a retail store approaches client terminal 200 shown in FIG. 2A. A "BEGIN" Window displayed on touch-screen 204 reads "Touch here to begin." The customer approaches the touch-screen 204 and touches the BEGIN Window. This sends a request to begin to PIN server 102. In stage 402, in response to receiving a request to begin, PIN server 102 transmits to the client terminal a list of products and services offered. For example, PIN server 102 could transmit: 1) cellular telephone service, 2) long-distance telephone service, 3) electricity, 4) gasoline, and so on. All of these goods and services would be available to the customer to purchase on a pre-paid basis. The list of products and services transmitted to the client terminal appears, for example, on touch-screen 204 shown in FIG. 2A. The customer then touches a desired good or service on touch-screen 204. This sends a request for the chosen good or service back to PIN server 102. For example, the customer selects "cellular telephone service."

In stage 404, PIN server 102 receives the request from the client terminal for the chosen good or service. In this example, PIN server 102 receives a request for cellular telephone service. In stage 406, the PIN server 102 transmits to the client terminal a list of providers for the requested good or service. For example, if the customer has requested cellular telephone service, PIN server 102 transmits a list of: AT&T, AIR TOUCH, and SPRINT. The customer then selects one of these offered providers by touching an option on touch-screen 204. This would send a request back to PIN server 102 for a particular requested provider. For example, the customer could select "AIRTOUCH."

In stage 408, PIN server 102 receives the customer's request for the particular provider requested.

In stage 409, PIN server 102 transmits to the client terminal a list of regions for the requested good or service. For example, if the customer requested "AIRTOUCH" in stage 408, then PIN server 102 would transmit a list of regions such as "AIRTOUCH NORTHEASTERN U.S.," or "AIRTOUCH NEW YORK CITY METROPOLITAN REGION," OR "AIRTOUCH PACIFIC REGION," etc. In stage 410, PIN server 102 receives the customer's request for a particular region.

In stage 411, PIN server 102 transmits a list of pre-paid monetary denominations offered. For example, if a request for "AIRTOUCH" is received, pre-paid cellular service for AIRTOUCH in the following monetary denominations could be offered: $10, $20, $50, and $100. Thus, a customer could choose to buy a $50 "virtual" phone card, which would provide him or her with $50 of pre-paid cellular service.

The PIN server 102 can determine what monetary denominations are available by one of the following methods. As a first method, PIN server 102 checks provider records 124, and looks up the record corresponding to the chosen provider (for example, AIRTOUCH). PIN server 102 then checks a field of the provider record to determine what monetary values are offered. As a second method, PIN server 102 checks PIN database 112, and determines what types of monetary denominations are available. For example, PIN server 102 can determine that it is presently out of stock of $50 AIRTOUCH PINs, but PIN server 102 has available $10 PINs, $20 PINs, and $100 PINs.

As an example, the customer could choose to purchase a $50 PIN from AIRTOUCH. The customer would receive a PIN, which would allow him or her to purchase $50 of cellular telephone service. As an alternative to transmitting a list of offered monetary denominations, in stage 410, the customer could alternatively be allowed to simply type in at a keypad a desired amount of service that he or she desires. For example, a message would appear on touch-screen, 204 stating "TYPE IN AN AMOUNT OF PRE-PAID SERVICE YOU WISH TO PURCHASE." The customer could then type in, for example, $50. PIN server 102 could then check PIN database 112 to see if it had any $50 PIN denominations available. If there was no $50 PINs available, PIN server 102 could, for example, transmit a message stating, "THERE ARE NO $50 PINS AVAIL- ABLE. WOULD YOU LIKE TO PURCHASE A $40 PIN OR A $75 PIN?" Alternatively, PIN server 102 could transmit a message stating "THERE ARE NO $50 PINS AVAILABLE FOR AIRTOUCH. HOWEVER, SPRINT AND MCI OFFER $50 PINS FOR CELLULAR TELEPHONE SERVICE. WOULD YOU LIKE TO PURCHASE FROM ONE OF THESE PROVIDERS?"

The customer can also be given an option to "View Rates." If the customer chooses this option, then a request to view rates is sent to the PIN server 102. In stage 412, the request is received by PIN server 102. In stage 414, PIN server 102 transmits rate information to the client terminal. For example, the rate information could specify that a $100 "virtual" pre-paid phone card purchased from AIRTOUCH has a cellular calling rate of $0.35 per minute, and the PIN expires in 6 months. A $5& virtual pre-paid phone card purchased from AIRTOUCH has a cellular calling rate of $0.40 per minute, and the PIN expires in 8 months. Providers may choose to offer lower rates for larger pre-paid purchases as a high volume discount. Further information can also be requested and provided to the customer depending on the particular product or service purchased. For example, if the customer is purchasing gasoline, the customer could request current price per gallons at various gas station locations for various octane levels.

In stage 416, PIN server 102 receives from the client terminal a request for one of the available monetary denominations. For example, the customer could select an option to purchase a $50 PIN from AIRTOUCH by touching the appropriate option on touch-screen 204.

In stage 418, PIN server prompts the customer at the client terminal to make payment for the requested PIN. Payment can be made by the customer in a number of ways. In the embodiment shown in FIG. 2A, the customer can pay the dealer by cash, credit card, debit card, smart card or any similar method (the customer pays a cashier behind cash register 202). Once the customer pays the dealer, then the dealer must transfer a portion of the payment to PIN server. Payment can be apportioned and transferred between the dealer and the operator of the PIN server by a number of methods. Some example methods:

First method "ACH WALLET": The dealer has a special account set up with the operator of the PIN server. The dealer stores money in the account before the PIN is purchased. Immediately before a customer purchases one or more PINs, the dealer pays a portion of the payment to the operator of the PIN server by transferring money from the dealer's account to such operator by ACH (automated clearing house) electronic funds transfer. This method of payment is referred to as "ACH wallet."

Second method "CREDIT ACCOUNT": The dealer has a credit account with the operator of the PIN server. The dealer is allowed a predetermined amount of credit based on the creditworthiness of the dealer. When a customer pays for one or more PINs, a portion of the payment is charged to the dealer's credit account. The dealer is then billed later for the amount charged.

Third method: The dealer simply provides credit card information to the PIN server. When customer purchases one or more PINs, a portion of the payment is charged to the dealer's credit card.

Fourth method: The customer's credit card information (or debit card, or smart card) is sent directly to the PIN server. The operator of the PIN server then charges the customer's credit card and sends a portion of the payment back to the dealer.

As will be understood by one skilled in the art, the above methods are by example only and there are a multitude of ways that payment can be arranged between the dealer and the operator of the PIN server. All of these methods do have one thing in common, however. The PIN is sent by the PIN server right after a payment is made (either by cash or credit). This makes the delivery of the PIN "on demand" and eliminates costs associated with filled inventory. Because the PIN is sent right after payment is made, the dealer has no costs associated with filled inventory. For example, the dealer does not have to contact the operator of the PIN server at the beginning of each month and order $10,000 worth of cards. The dealer does not have to predict which cards will be popular, and how many cards to order of each type. Payment for the PIN is charged at the time of each transaction, and thus the dealer has no filled inventory costs.

In the automated kiosk embodiment shown in FIG. 2B, the customer can enter payment by swiping a credit card through credit card receptor 214, or inserting cash into bill receptacle 218 or coin receptacle 220. Using the personal computer of FIG. 2C, the customer can enter payment by typing in his or her credit card information.

After payment has been received and verified in stage 418, then in stage 420 PIN server retrieves a PIN from the database having the appropriate characteristics selected by the customer. For example, if the customer chose to purchase a $50 virtual pre-paid phone card for pre-paid cellular telephone service from AIRTOUCH, then PIN server 102 could retrieve record 312*f* shown in FIG. 3. In stage 422, PIN server 102 transmits PIN 0948574995 (this PIN is shown in PIN field 306 of exemplary record 312*f* in FIG. 3) to the customer at the client terminal. Once a PIN has been retrieved from PIN database 112 and transmitted to the customer, the PIN record is marked as sold and unavailable from PIN database 112 so that it will not be sent to another customer. Alternatively, the PIN record can be marked as used, so that it will not be retrieved for another customer.

PIN server 102 also transmits any instructions necessary to use the PIN. For example, PIN server 102 can transmit a telephone access number, which the customer needs to dial before placing a cellular telephone call and entering the PIN. The telephone access number and other instructions will be unique for each provider. These instructions can either be stored in each individual record 312 in PIN database 112, or the instructions can be stored in provider records 124.

The customer could also request to receive multiple PINs. For example, the customer could purchase 3 $50 PINs for AIRTOUCH cellular telephone service. After the customer enters $150 in payment, PIN server 102 transmits 3 $50 PINs to the customer at the client terminal.

At stage 424, the client terminal prints out a receipt for the customer. The receipt includes the requested PIN(s) purchased by the customer, and any instructions for using the PIN such as a telephone access number. The receipt can also contain advertisements. Advertisers pay the operator of PIN server 102 for the opportunity to have their ads displayed on receipts. The receipt is a printed piece of paper. Alternatively, the receipt could be in the form of a plastic card. PIN server 102 then returns back to the first stage 400, waiting for the next customer to request to "BEGIN".

Figure 5:
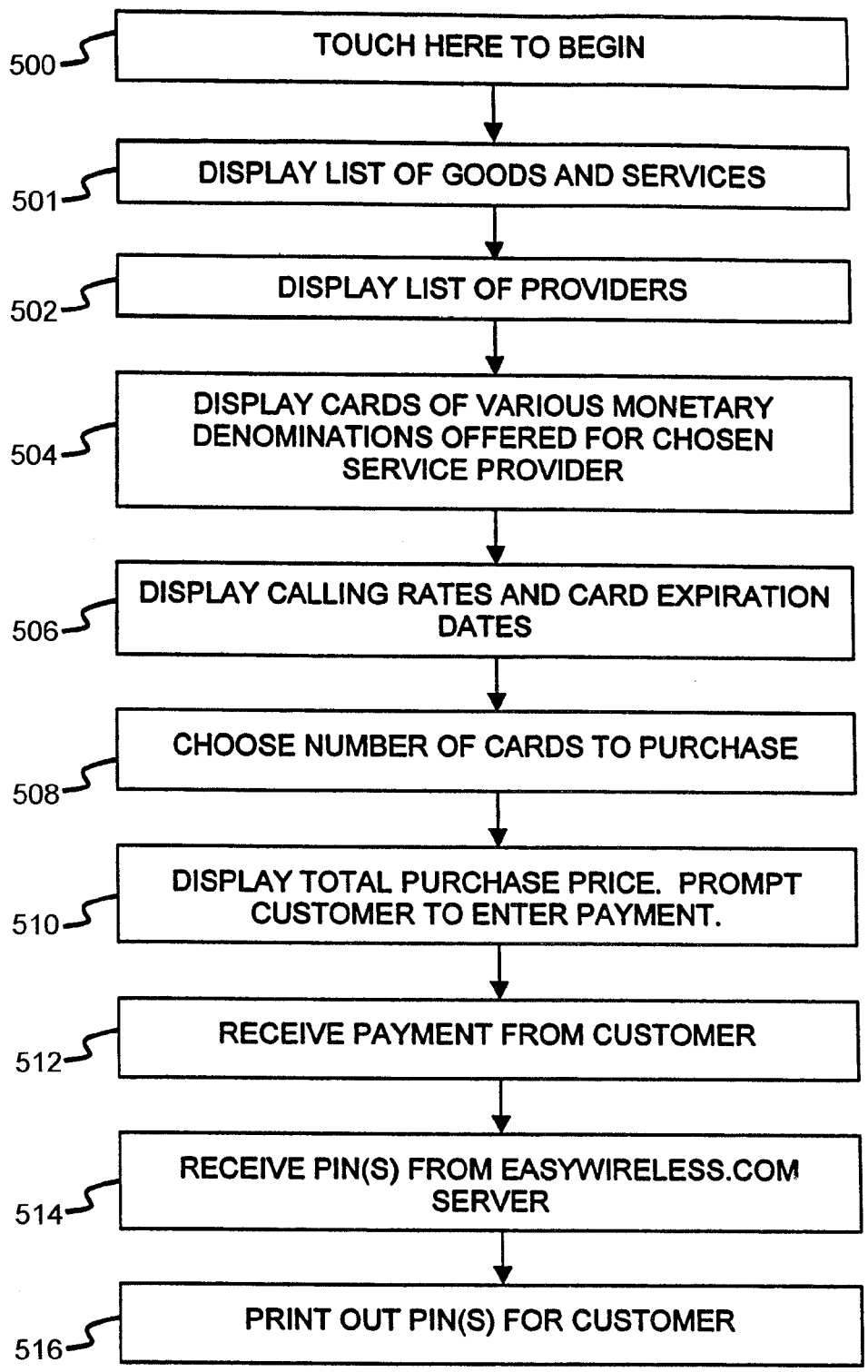
FIG. 5 depicts a flowchart illustrating a method of operating a client terminal.

FIG. 5 depicts a flowchart illustrating a method of operation of client terminals 106, 108, 110 (shown in FIG. 1), 200, 210, and 222 (shown in FIG. 2). FIGS. 6-10 show exemplary displays to be shown on the screen of the client terminal. The method of operation will now be described with reference to the flowchart of FIG. 5 and the screens shown in FIGS. 6-10.

In stage 500, a window appears which states "TOUCH HERE TO BEGIN." The customer can begin by touching the touch-screen 204 or 212 in the appropriate location. If the customer has accessed the PIN server 102 by using personal computer 222, the customer can begin by entering an appropriate URL into the browser. This would bring the customer to the web page running on PIN server 102. The customer could click on a link labeled "BEGIN" to begin the purchase process.

Figure 6:
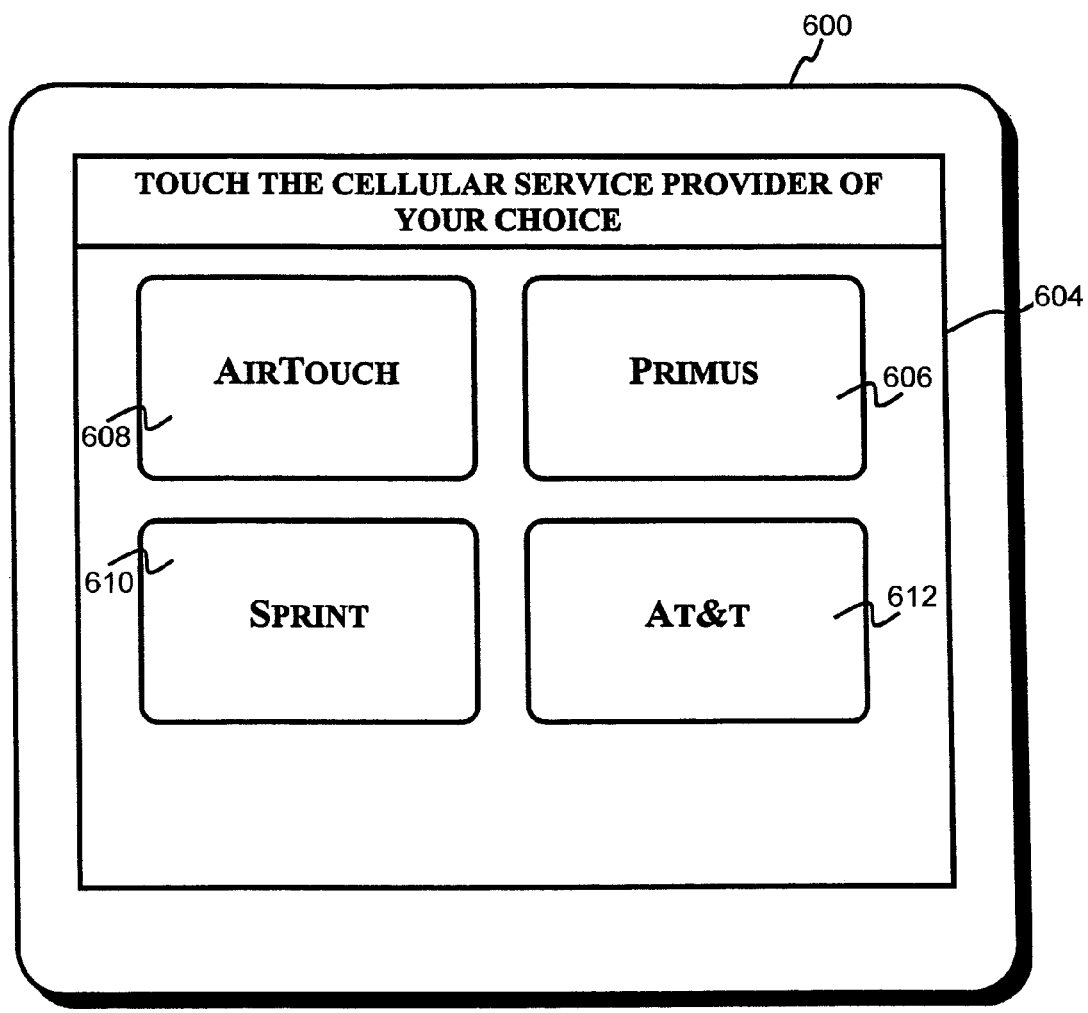
FIG. 6 depicts an example of a display allowing the user to choose a provider.

In stage 501, the client terminal displays list of offered goods and services, such as cellular telephone service, gasoline, electricity, dry-cleaning, etc. The customer can then choose one of these goods or services to purchase. Assume, for this example, that the customer has selects "cellular telephone service". In stage 502, the customer is provided with a list of providers for the chosen good or service and asked to choose a provider. FIG. 6 shows an exemplary screen corresponding to stage 502 (assuming that the customer has selected "cellular telephone service"). Touch-screen 600 displays browser window 604. Four service provider options are shown: AIR TOUCH option 608, PRIMUS option 606, SPRINT option 610 and AT&T option 612. For the purposes of this example, assume that a customer touches AIRTOUCH option 608.

Figure 7:
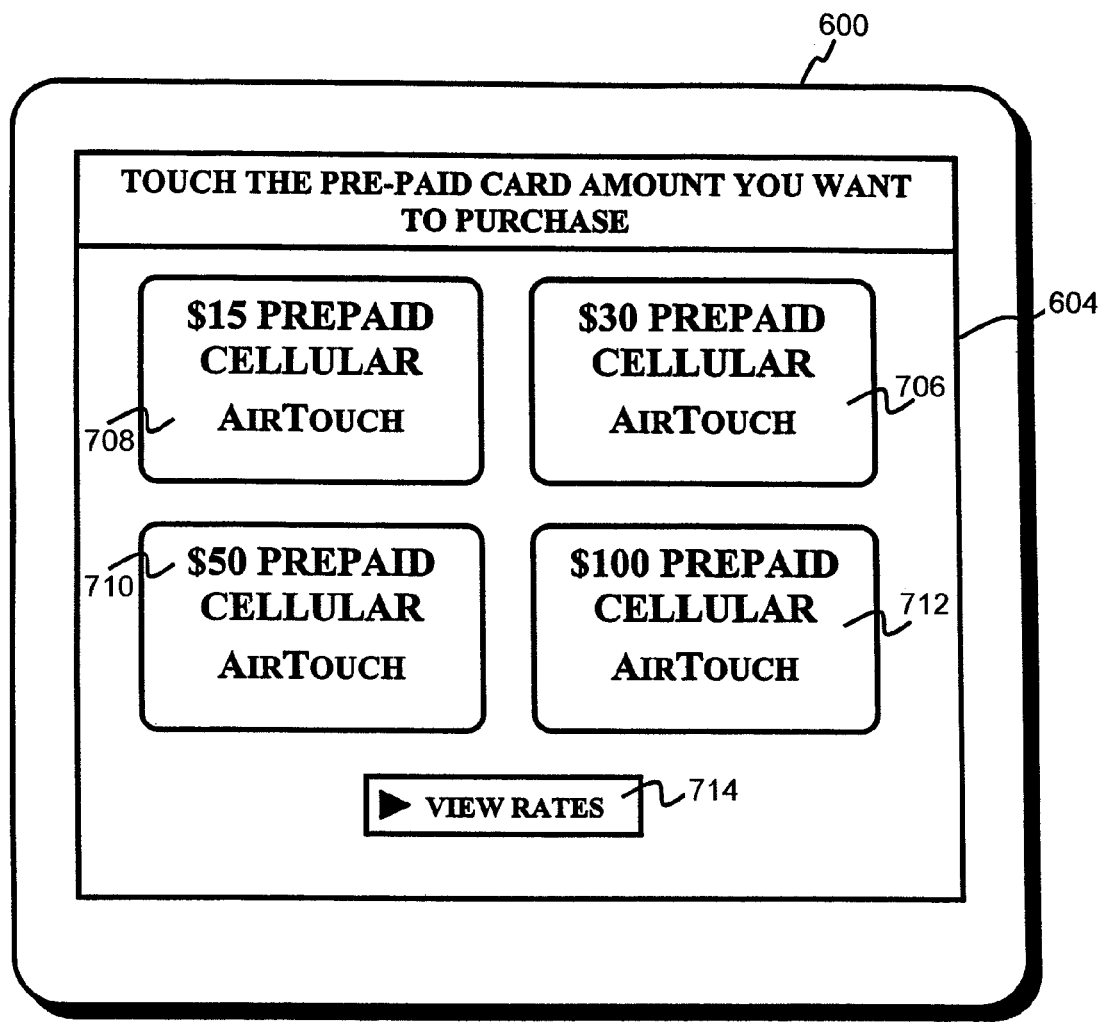
FIG. 7 depicts an example of a display allowing the user to choose a monetary denomination.

In stage 504, the display screen displays virtual cards of various monetary options, which are offered, for the chosen good or service provider (which in this example is AIRTOUCH). FIG. 7 shows an exemplary display screen corresponding to stage 504. Four possible monetary denominations may be selected. The customer can choose the $15 option 708, $30 option 706, $50 option 710, or $100 option 712.

Figure 8:
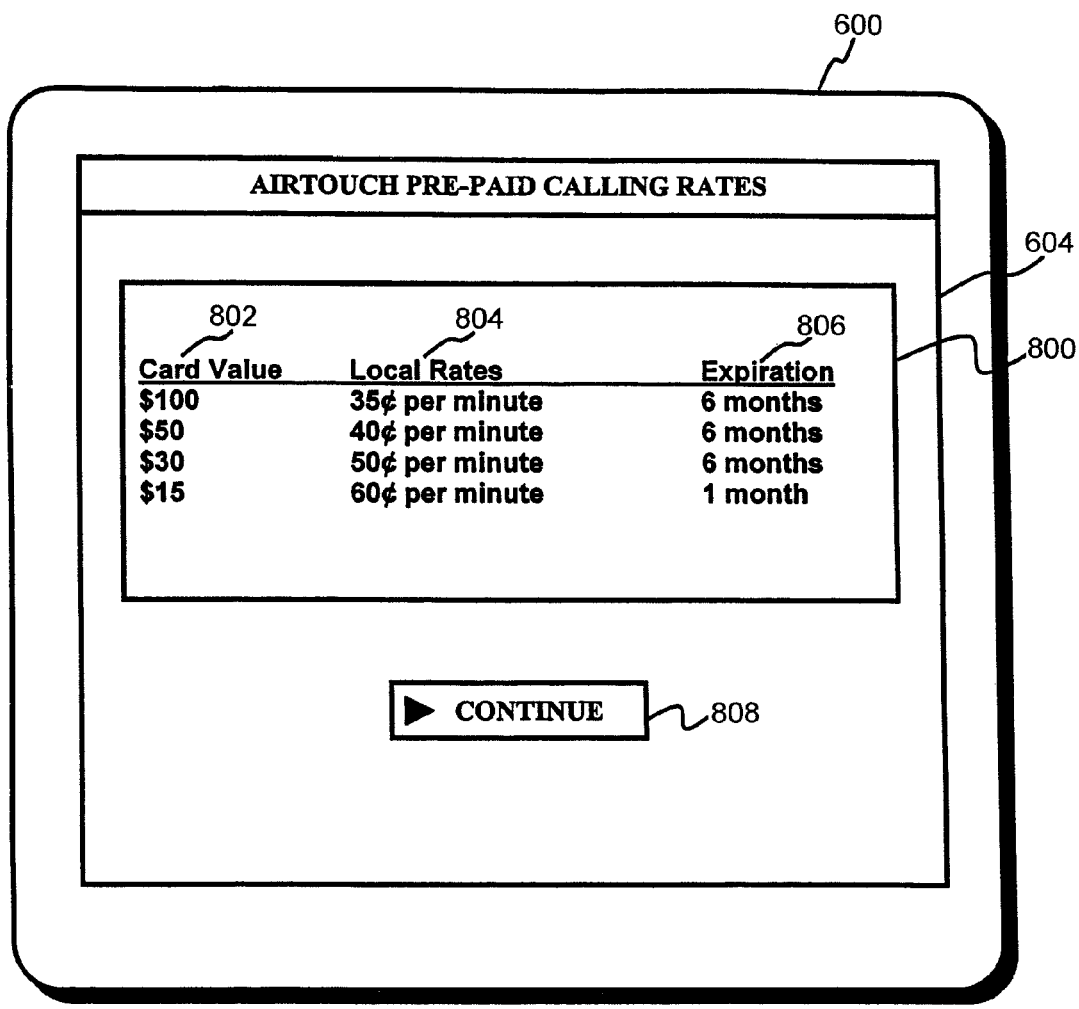
FIG. 8 depicts an example of a display showing the user rate and expiration information.
Figure 9:
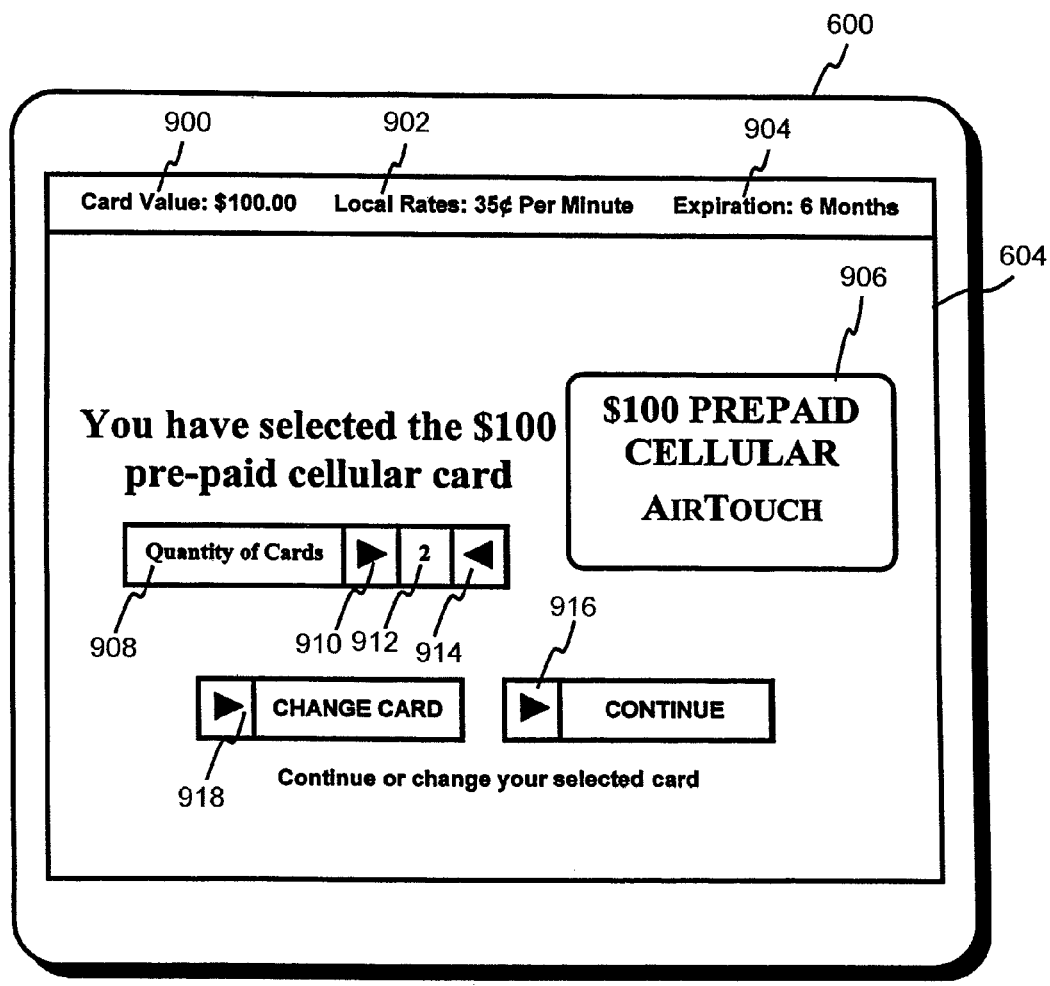
FIG. 9 depicts an example of a display allowing the user to choose a quantity of cards.

In stage 506, the display screen displays rate information, if desired by the customer. The customer is given the option of viewing rates by touching the VIEW RATES option 714 shown in FIG. 7. If the customer decides to touch VIEW RATES option 714, then in stage 506, the screen displays calling rates, card expiration dates, or any other information applicable to the chosen good or service, or specific to the particular good or service provider chosen. For example, if the customer who has chosen to purchase AIRTOUCH cellular service, touches the VIEW RATES option 714, then FIG. 8 shows an exemplary screen. Information window 800 provides a number of information fields. Card value field 802 displays the various virtual card monetary values offered. Local rates field 804 displays the calling rate per minute for each card value. Expiration field 806 displays the expiration date beyond which the PIN is no longer usable. As shown in FIG. 8, AIRTOUCH offers a discount for higher value card purchases. In other words, the calling rate goes down for higher card value purchases. By touching the continue field 808, the customer can return to the screen shown in FIG. 7.

In FIG. 7, the customer selects a particular monetary denomination offered by touching the screen in an appropriate location. In this example, assume that the customer has chosen the $100 virtual card option 712. This brings up the display shown in FIG. 9. In stage 508, the customer is given the choice of how many cards he or she wishes to purchase. The quantity of cards window 908 in FIG. 9 displays the number of virtual cards to be purchased. The customer can touch arrow 910 to increment the number of virtual cards to be purchased. The number of cards to be purchased is shown in box 912. The customer can touch arrow 914 to decrement the number of virtual cards to be purchased. Field 900 and virtual card 906 display the monetary value of the virtual card that was chosen by the customer. Local rates field 902 displays the calling rate for the chosen virtual card. Expiration field 904 displays when the virtual card will expire.

If the customer changes his or her mind, and wishes to purchase a card with a different value, the customer can return to the screen shown in FIG. 7 by touching the CHANGE CARD field 918. Otherwise, the customer can proceed by touching the CONTINUE field 916. This brings up the display shown in FIG. 10A, corresponding to stage 510. Field 1000 displays the total purchase price. Since the customer has requested to purchase two pre-paid virtual $100 cards from AIR TOUCH, the total purchase price is $200. Field 1002 instructs the customer to insert payment. This message could alternatively tell the customer to enter credit card information, swipe a credit card, a debit card, a smart card, or pay cash to a cashier depending on the particular client terminal being used and/or a chosen method of payment.

Figure 10A:
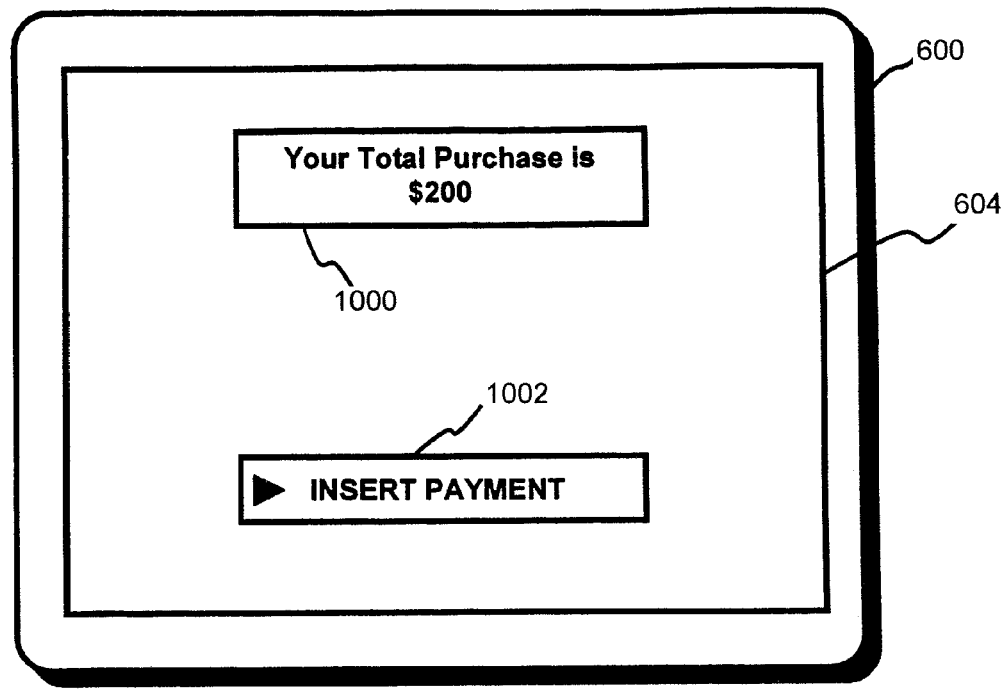
FIG. 10A depicts an example of a display screen requesting payment from the user.
Figure 10B:
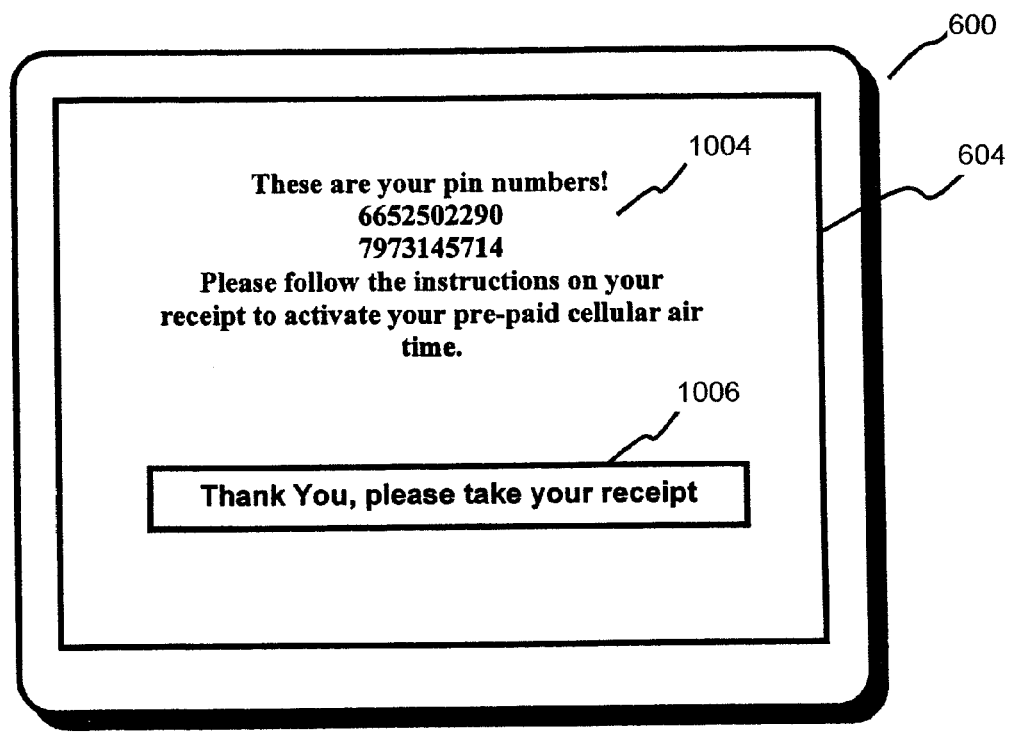
FIG. 10B depicts an example of a display screen showing the user his or her purchased PIN(s)

In stage 512, payment is received from the customer. After payment has been received and verified, PIN server 102 retrieves the requested PIN(s) from PIN database 112 and transmits the requested PIN(s) to the client terminal in stage 514. The PIN(s) can be displayed on the screen as shown in FIG. 10b, field 1004. Message 1006 informs the customer to take a receipt. A receipt is printed out in stage 516. The receipt will contain the requested PIN(s) and any instructions necessary for using the PIN such as an access number to call. If privacy is a concern, it might be preferable not to display the PINs on the screen, but instead to only print the PINs on the receipt.

Figure 11:
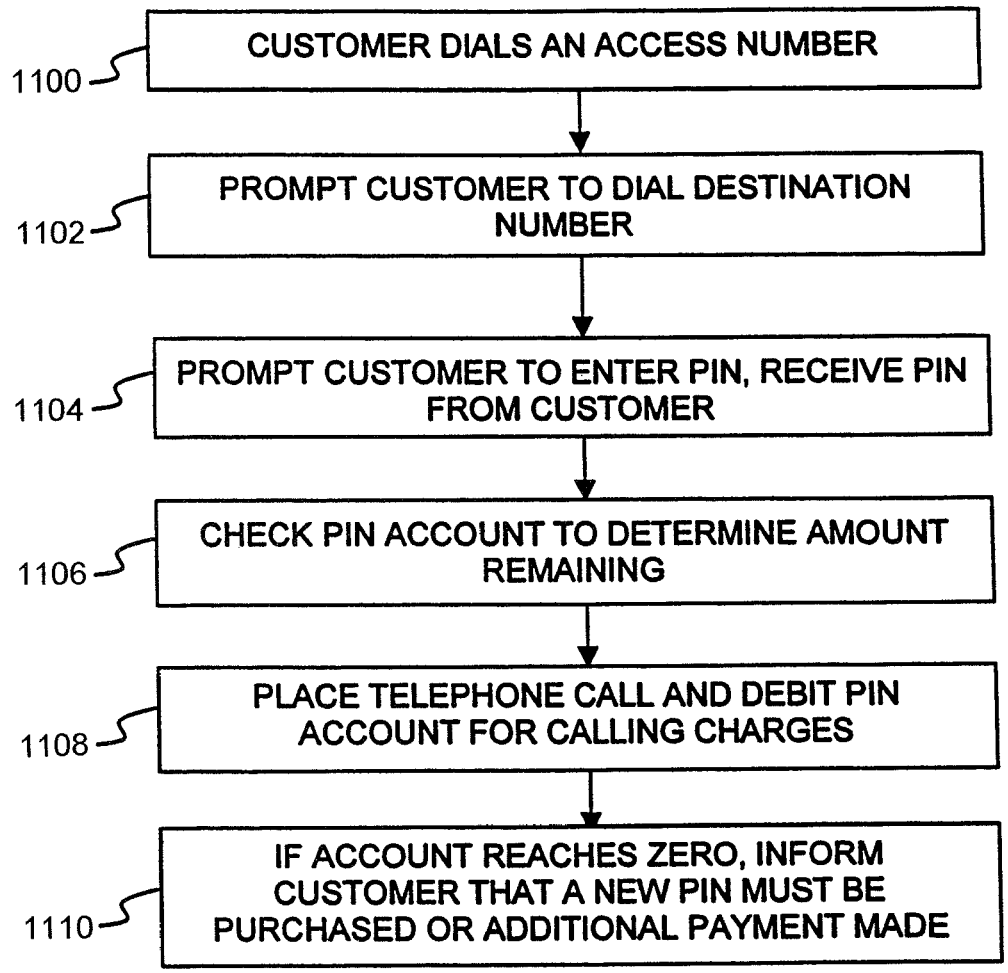
FIG. 11 depicts a flowchart illustrating a method of using a PIN to access telephone service.
Figure 12:
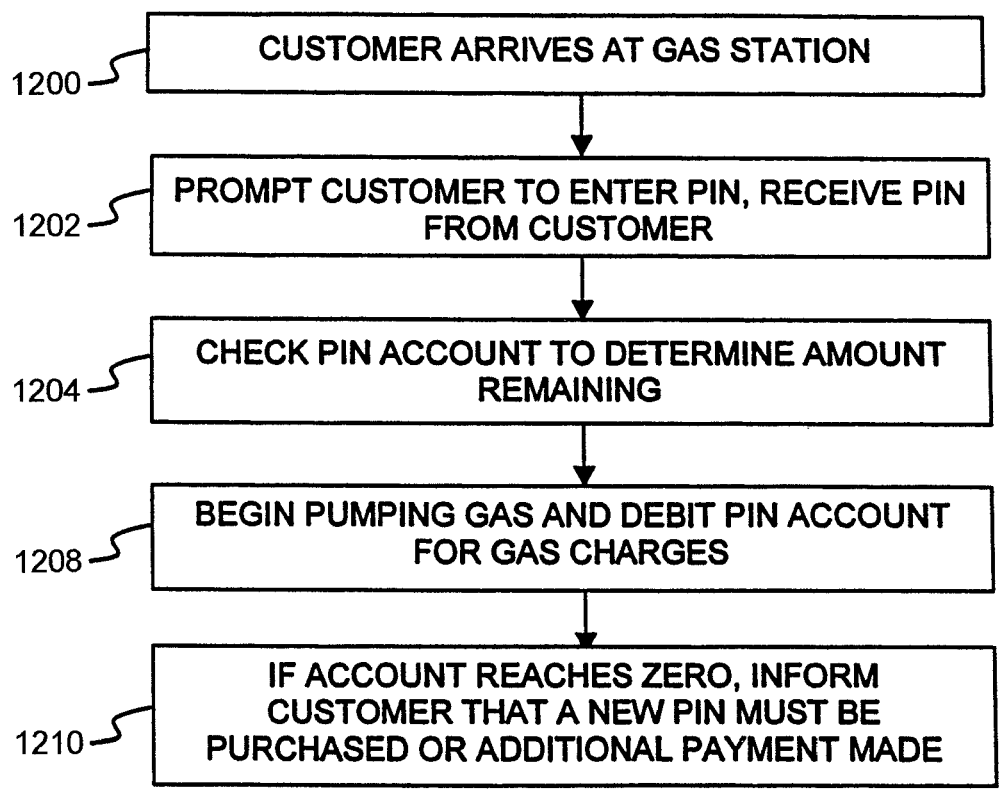
FIG. 12 depicts a flowchart illustrating a method of using a PIN at a gas station.

FIGS. 11 and 12 depict a flowchart illustrating a method of using the PIN once the customer has received the PIN from PIN server 102. FIG. 11 shows an exemplary method, which assumes that the customer has purchased pre-paid telephone service. As an example, assume that a customer has purchased $50 of pre-paid telephone service. A receipt was printed out for the customer providing a PIN and a telephone access number. In stage 1100, the customer dials the access number, which was provided on the receipt. Typically, the access number is specific to the chosen service provider. For example, if the customer has previously purchased $50 of pre-paid telephone service from AIRTOUCH, the customer will be given an AIRTOUCH access number. When the customer dials the access number, the customer's call will be routed to a switch operated by AIRTOUCH. The access number is preferably a toll-free 1-800 number or a local number. In stage 1102, the customer is prompted to dial the destination number that he or she wishes to call. In stage 1104, the customer is prompted to enter a PIN, which was printed out, on the receipt. The customer then dials in his or her PIN. An AIRTOUCH server then checks a PIN account for the entered PIN. In stage 1106, the AIRTOUCH server checks to see how much money is remaining in the account. If there is enough money left in the pre-paid account to place the desired call, then the call to the destination number is placed in stage 1108. While the call is continuing, the PIN account is debited in accordance with the calling charges. In stage 1110, if the account value reaches zero, the customer is informed that a new PIN must be purchased or additional payment must be made. As an option, the customer can be allowed to dial in a credit card number to continue with the call.

FIG. 12 depicts a flowchart illustrating a similar method to FIG. 11. However, FIG. 12 depicts an example where the customer has purchased pre-paid gasoline. For this example, assume that a customer has previously purchased $50 of pre-paid MOBIL gasoline. A receipt was printed out for the customer providing a PIN. In stage 1200, the customer arrives at a local MOBIL gas station. The customer uses a keypad and display screen at a self-service pump. The customer pushes a button indicating that he or she wishes to pay with a pre-paid PIN account. In stage 102, the customer is prompted to enter a PIN. The customer enters the PIN for which he or she pre-paid. The PIN is sent to a server operated by MOBIL. The server checks a PIN account for that PIN to determine how much money is remaining in the account. If there is money left in the pre-paid account, then the customer is told to begin pumping. The pre-paid PIN account is then debited in accordance with charges for the gasoline pumped. If the account reaches zero, the customer is informed that additional payment must be made.

PIN server 102 essentially serves as a PIN warehouse. The operators of PIN server 102 can obtain PINs from various providers in two ways. A first method of obtaining PINs from providers is as follows. PINs are purchased by the operator of the PIN server 102 directly from the providers. For example, a $10 pre-paid PIN could be purchased from AIRTOUCH at a wholesale price of $8 and then stored in PIN database 112. In other words, AIRTOUCH sells the PIN to the operator of the PIN server 102 for $8, and the operator resells the PIN to the customer for $10. Thus, the operator would make a $2 profit on the sale of the PIN.

A second method of obtaining and selling PINs is as follows. The PINs are received from various providers at no cost to the operator of the PIN server 102, who serves as a warehouse for the PINS. After a PIN is sold to a customer, the payment received from the customer is forwarded to the appropriate provider, minus a commission for such operator.

Another feature of the system is the ability to offer discounts. PIN server 102 can send advertisements and discount offers to the client terminals. Service providers can offer discounts such as "PRE-PAID CELLULAR SERVICE AT 30 CENTS PER MINUTE. 10 CENTS PER MINUTE CHEAPER THAN NORMAL RATE!" Providers will be happy to provide such discounts for pre-paid purchase because there are many advantages to selling pre-paid service. The provider does not have to worry that the customer won't pay his bills, because the calls are pre-paid. The provider does not have to keep track of billing addresses and mailing bills to the customer. The provider gets the money before the call is even made, and thus earns interest on the money. Because of these advantages of pre-paid service, it is often advantageous to providers to offer a discount for pre-paid purchases.

FIGS. 13-16 depicts a purchase-ordering feature. The purchase ordering feature is intended to be used by dealers who wish to purchase a batch of various types of PINs, for the purpose of reselling these PINs to individual customers. The purchase order feature allows a dealer to order a desired assortment of PINs from different providers of different denominations.

Figure 13:
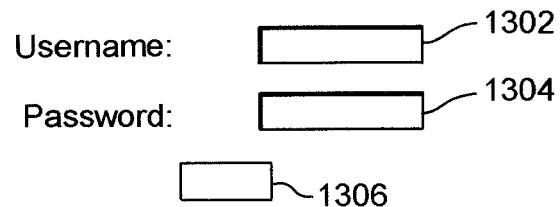
FIG. 13 depicts an example display screen for allowing a user to log-in to a purchase ordering system.

FIG. 13 depicts an example of a login screen for allowing a user to enter the purchase ordering system. To enter the purchase ordering system, the user must be a registered user. Typically, users of the purchase ordering system will be dealers who resell the PINs to other customers. The dealers can buy PINs in bulk, and thus receive a special wholesale discount. As an option, in addition to dealers, preferred customers could be allowed to use the purchase ordering system. A user enters his or her user name in username field 1302 and enters a password in password field 1304. The user then hits the Enter button 1306.

If the user's username and password is recognized as being a registered user, then the purchase order data entry screen is displayed as shown in FIG. 14. Dealer Information field 1402 displays the name, address, and any other pertinent identifying information of the dealer who has logged in to the purchase order data entry system. If other customers besides dealers are allowed to log in to the purchase order data entry system, then field 1402 can be labeled "customer information" or "user information."

Payment method field 1404 displays the payment method and details, such as credit card information, or ACH wallet, etc. Current balance field 1406 displays whether the user has an outstanding balance: i.e. either the dealer owes money to the operator of the PIN server 102 or has a certain amount of credit remaining.

Table 1407 allows the dealer to many individual purchase orders. Each row of the table represents one individual purchase order. For example, the dealer can order ten $50 cards from AT&T, and 20 $100 cards from Sprint, and 15 $75 cards from Verizon Wireless, etc.

Carrier column 1408 allows the user to select a unique carrier for each purchase order of PINs. Region column 1410 allows the user to select a particular region for each separate purchase order of PINs. Card type column 1412 allows the user to select a particular card monetary denomination for each separate purchase order of PINs. Qty column 1414 allows the user to select a quantity of cards to purchase for each separate purchase order of PINs. Wholesale column 1416 displays the wholesale per-PIN price for each separate purchase order of PINs.

Totals column 1418 displays the total price paid for each purchase order. Totals column 1418 field is simply the wholesale column price 1416 multiplied by the Qty column 1414. Add/Del column 1420 allows the dealer to confirm the addition of each individual purchase order, or to change his mind and delete an entered order. Grand total field 1421 displays the sum of all the individual totals from each individual purchase order.

As an example of an individual purchase order, the first row shown in FIG. 14 indicates that the user has selected one order of Verizon Wireless PINs for the Northwest region. The dealer has ordered five $30 PINs. The dealer is getting a discount, so the dealer only has to pay $25 for the $30 PIN. The total paid for the dealer for that individual purchase order is $250.00. If the dealer changes his mind, and wishes to erase this order, he can do so by clicking "DEL."

If the user wishes to cancel his or her order, the user can click Cancel Order button 1426. If the user wishes to update the price totals shown in column 1418 and field 1421, the user can hit the Update Order button 1422. If the user is satisfied with what he or she has entered, then the user can proceed with the order by clicking the Update Order button 1426. This brings up the Purchase Order Summary screen displayed in FIG. 15.

The Purchase Order Summary screen shown in FIG. 15 allows the user to review his or her entire purchase order and check that everything has been entered correctly. If the user wishes to change something, the user can click Change Purchase Order button 1502. This will take the user back to the Purchase Order Data Entry screen displayed in FIG. 14.

If the user is satisfied with the purchase order summary displayed in FIG. 15, then the user can click Submit P.O. button 1506. The user will automatically be charged by whatever payment method was previously selected (e.g. charged to an on-file credit card, ACH funds transfer, etc.). The user will then get a printed out receipt. A typical receipt is shown in FIG. 17 and will be discussed later.

If the user wishes to pay by an alternate credit card, he or she can click Pay With Alternate Credit Card 1504. This takes the user to the Alternate Credit Card Payment screen shown in FIG. 16. The user can then enter credit card information in the Billing Information fields.

Figure 18:
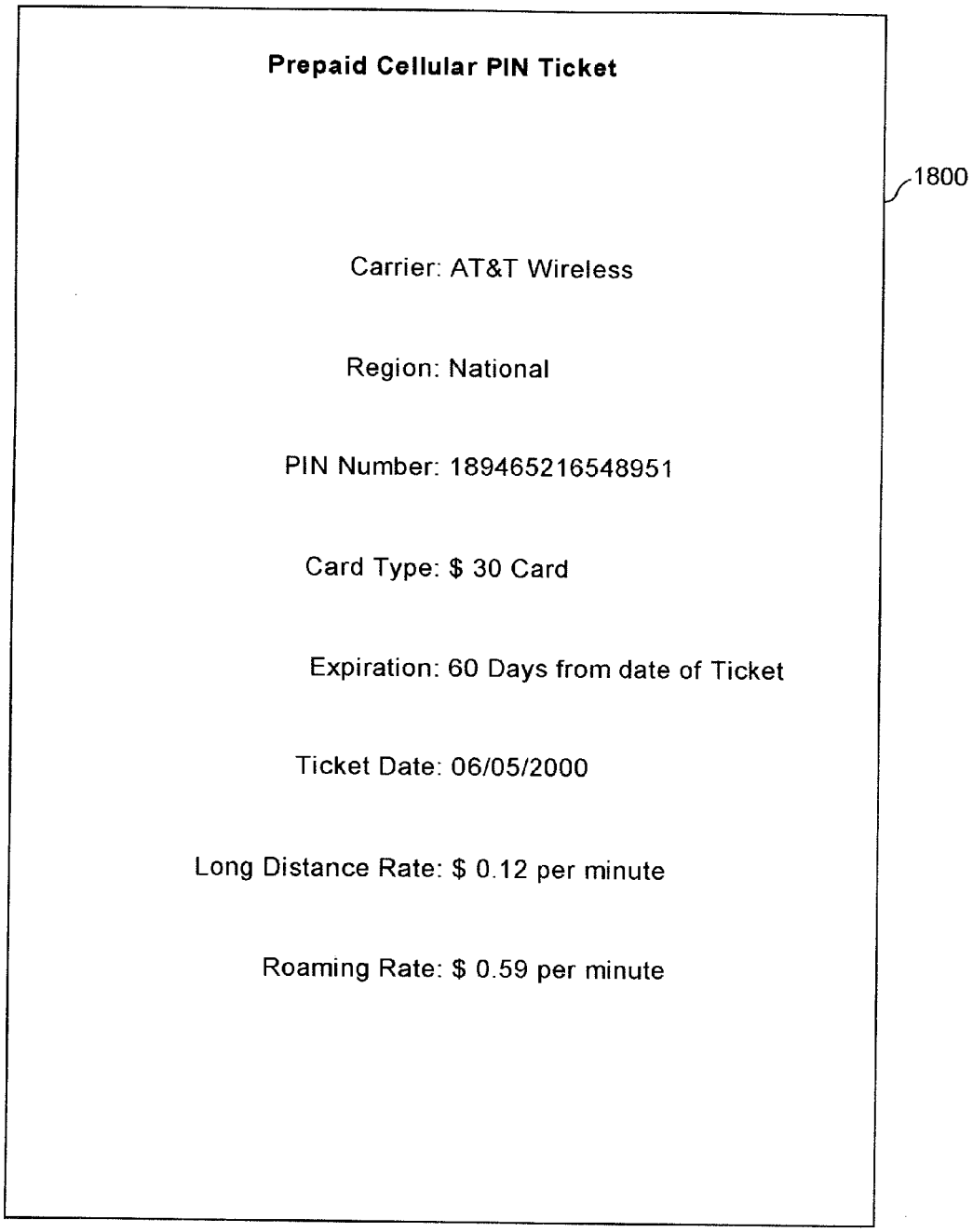
FIG. 18 shows an example of a prepaid cellular PIN receipt/ticket.

FIG. 18 shows an example of a Prepaid cellular PIN ticket 1800. Ticket 1800 is the receipt that is printed out when an individual user orders a single PIN from PIN server 102 from one of the embodiments shown in FIG. 2 (this receipt is not from the purchase ordering system which has a more elaborate printout shown in FIG. 17).

Figure 19A:
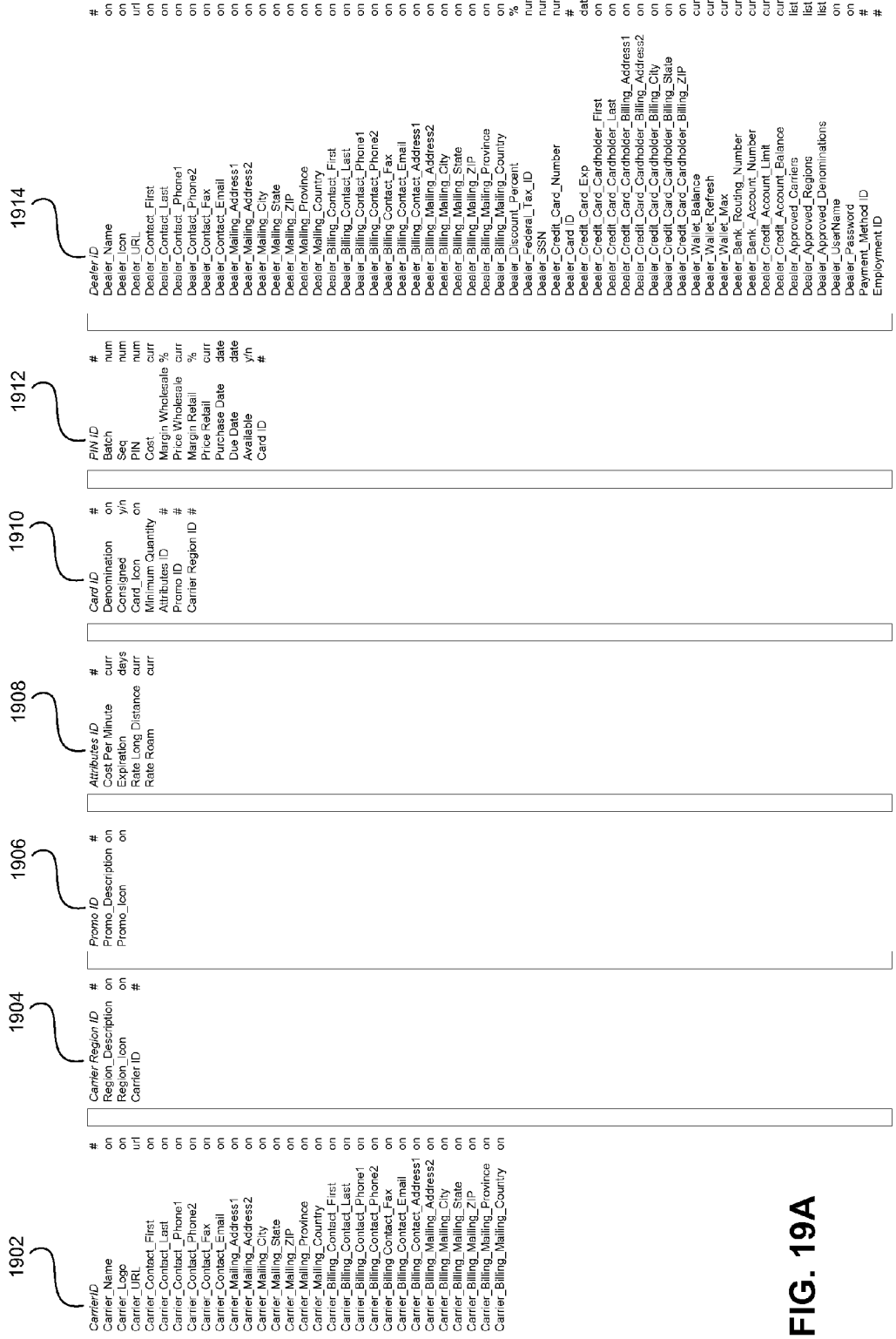

FIGS. 19A and 19B depict another example of a database record in PIN database 112. This example shows a more detailed record than the example record shown in FIG. 3. Carrier ID fields 1902 contain fields providing information pertaining to the individual carrier selected. Carrier region fields 1904 contains fields providing information pertaining to the carrier region selected. Promo ID fields 1906 contains information pertaining to any promotional program(s) that the PIN was purchased under. Attributes fields 1908 contains information pertaining to the PIN attributes such as the calling cost per minute, PIN expiration, long distance rate, and roaming rate. Card ID fields 1910 contains various identification fields associated with the PIN. PIN ID fields 1912 contain fields providing information pertaining to PIN identification. Dealer ID fields 1914 contain information pertaining to the dealer where the PIN is purchased. When a PIN is purchased at a dealer, Dealer ID fields 1914 gets filled in with the corresponding dealer information. Sub/kiosk ID fields 1916 contain information pertaining to a kiosk where the PIN is purchased. When a PIN is purchased, these fields get filled in with the kiosk information associated with the kiosk where the PIN was purchased. POS Type ID fields 1918 contain additional information pertaining to kiosk identification. Payment_method ID fields 1920 contain information pertaining to the method of payment. Credit Card ID fields 1922 contain credit card information, if the PIN was purchased by credit card. Lastly, Employee ID fields 1924 contain information pertaining to an employee who may have made the PIN sale, and any commission, which the employee receives for the sale.

Every PIN in PIN database 112 has its own associated record, as shown in FIGS. 19A and 19B. The records shown in FIGS. 19A and 19B are directed towards wireless telephone service. However, different types of records can be used which are tailored to the product or service being sold, such as gasoline. Each PIN has its own associated record as shown in FIGS. 19A and 19B, even before the PIN is purchased. Every time a new PIN is created in the system, a new record is made. When the PIN is purchased by a customer or dealer, the information about the sale is filled in to the appropriate fields in the record, and the record is marked as sold so that the PIN is not resold to another customer or dealer.

Figure 20:
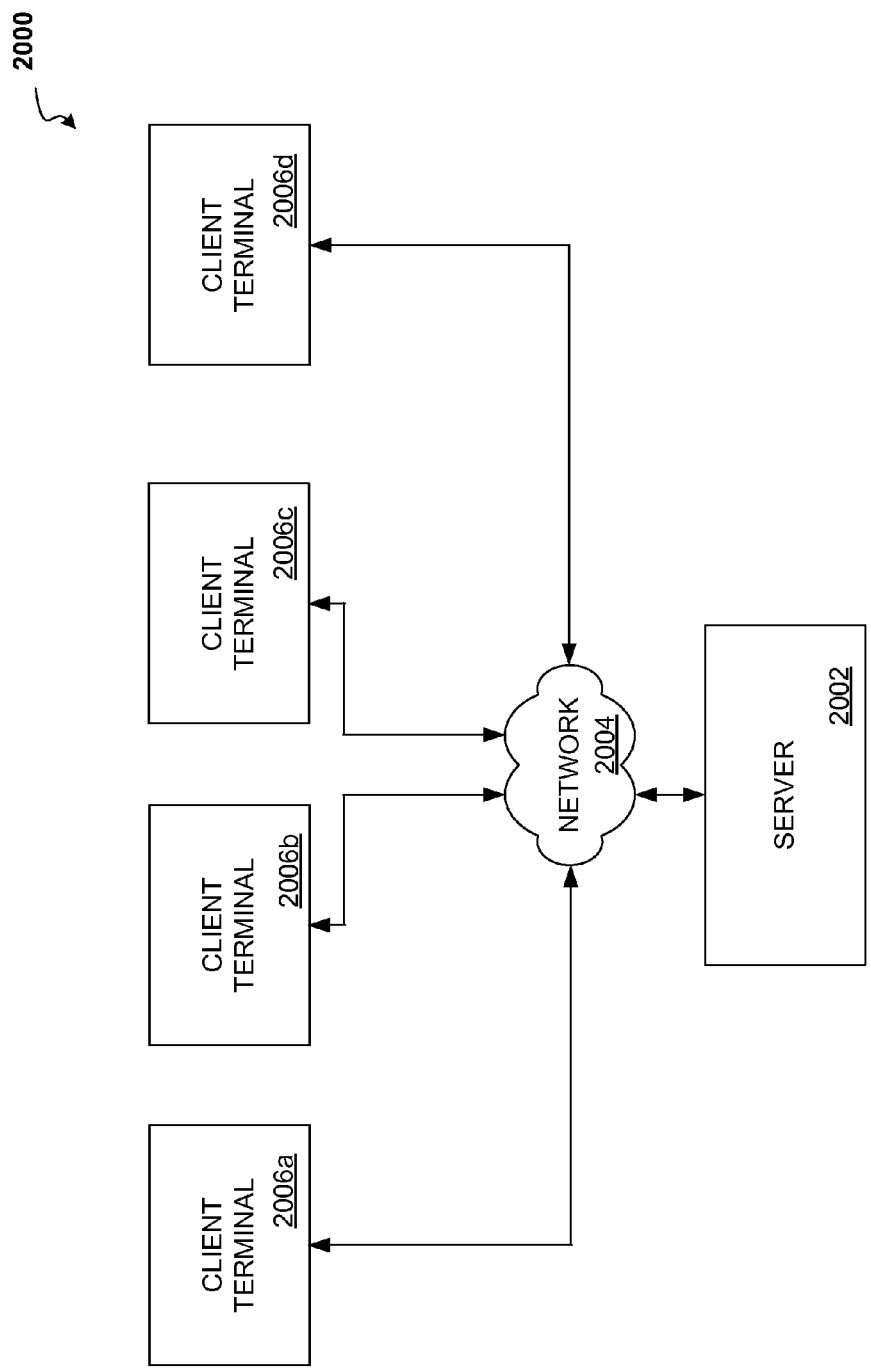
FIG. 20 shows an overview of a system throughout which PINs are distributed and dispensed in a manner consistent with the present invention.

Referring next to FIG. 20, shown is an overview of a system 2000 throughout which PINs are distributed and dispensed in a manner consistent with the present invention. As shown, server 2002 is coupled to network 2004. Server 2002 can be any large computer or network device. Network 2004 can be any network connecting computers, such as the Internet or the conventional telephone network (POTS). Client terminals 2006a-d are communicatively coupled to the server 2002 via the network 2004.

Except as otherwise described below, the client terminals 2006a-d are configured to operate in much the same way as the client terminals 106, 108, 110 (described with reference to FIG. 1) in accessing server 2002 via network 2004 for the purpose of obtaining PINs. However, the client terminals 2006a-d of FIG. 20 are also configured to cache limited quantities of certain types of PINs, and to request the server 2002 to replenish these PIN repositories to specified levels. Similarly, the server 2002 is configured to operate in much the same way as the server 102. However, the server 2002 in the present embodiment is also disposed to provide PINs to replenish the PIN caches respectively maintained by the client terminals 2006a-d. As one of ordinary skill in the art will appreciate, any of the client terminals described herein may be realized by a combination of hardware and software which may be implemented in a variety of programmable devices.

PINs delivered by the client terminals 2006a-d may be associated with offerings (e.g., product/service, region, denomination) in a variety of ways, and such PINs may be requested in a variety of ways. In some embodiments, each PIN is identified and requested by a stock keeping unit (SKU) and/or universal product code (UPC). In these embodiments each PIN-based SKU or UPC summarizes an offering of a service/product, a region (i.e., that the service/product is available or applicable), the provider (e.g., carrier) of the product/service and/or the denomination (e.g., monetary value). As a consequence, a user's selection may include a particular product/service, a provider and/or denomination, and in the exemplary embodiment, the user's client terminal $2006_{a-d}$ associates a PIN-based SKU or UPC with the user's selection. The client terminal $2006_{a-d}$ then requests a PIN by its corresponding SKU or UPC number.

Figure 21:
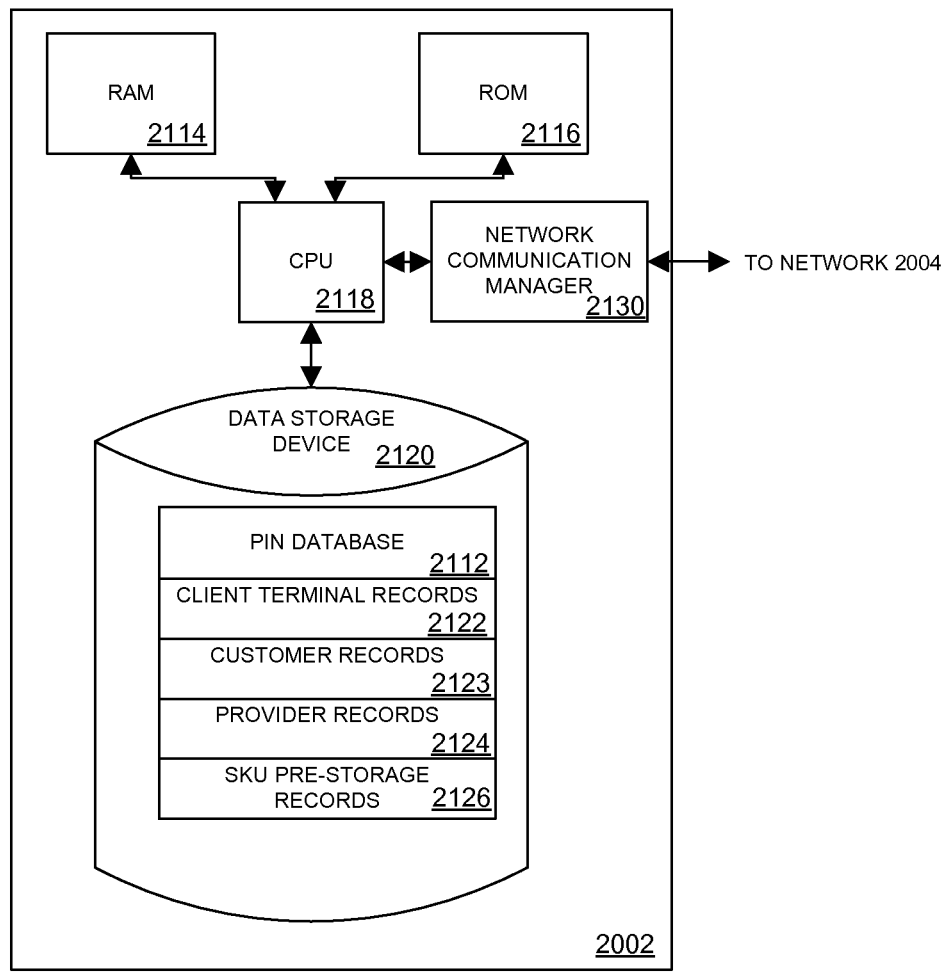
FIG. 21 shows a schematic diagram of the structure of one embodiment of a PIN server included within the system of FIG. 20.

Referring next to FIG. 21, shown is a schematic diagram of the structure of one embodiment of the server 2002. As shown, the server 2002 includes many of the same components of the server 102 described with reference to FIG. 1 including RAM 2114, ROM 2116, CPU 2118, a data storage device 2120, and a network communication manager 2130. The data storage device 2120 contains a personal identification number (PIN) database 2112, client terminal records 2122, customer records 2123, provider records 2124, and SKU pre-storage records 2126.

Consistent with the illustrated embodiment of the invention, the SKU pre-storage records 2126 include a record for each terminal $2006_{a-d}$ indicating which PIN-based SKUs may be pre-stored on such terminal $2006_{a-d}$. For example, although a given terminal $2006_{a-d}$ may be authorized to sell many different SKUs, in many cases the majority of sales transacted through the terminal $2006_{a-d}$ are for a relatively small number of "high-volume" SKUs. In the exemplary embodiment the pre-storage record 2126 for the given terminal $2006_{a-d}$ will reflect a "high-water mark" for each high-volume SKU. In this regard each high-water mark is indicative of the number of prepaid PINs for a particular high-volume SKU permitted to be stored on the applicable terminal $2006_{a-d}$. As is described below, the server 2002 utilizes the value of the high-water mark characterizing a given high-volume SKU in determining the number of prepaid PINs to provide the corresponding client terminal $2006_{a-d}$ in response to a request from such terminal to replenish its local supply of the high-volume SKU.

Figure 22:
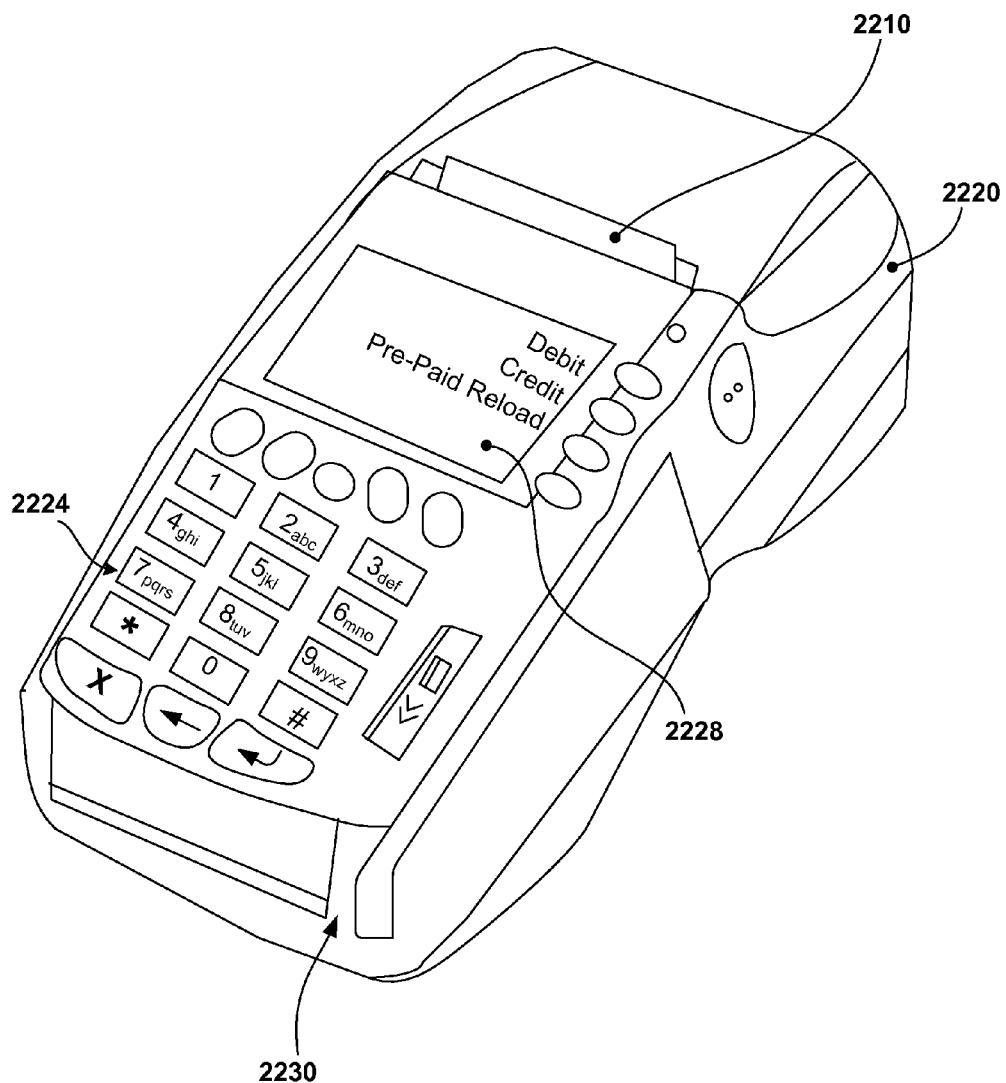
FIG. 22 depicts a physical embodiment of a client terminal included within the system of FIG. 20.

Turning now to FIG. 22, there is illustrated a physical embodiment of one of the client terminals $2006_{a-d}$. Each client terminal $2006_{a-d}$ functions to vend a receipt 2210 corresponding to a prepaid telephone or cellular telephone card, prepaid gasoline card, or any other product or service premised upon dispensing of a PIN to a user. The terminal $2006_{a-d}$ is contained within a housing 2220 that encloses a magnetic stripe reader, an integrated printer unit for printing receipt 2210, a processor, memory and communication circuitry (see FIG. 23). The housing 2220 defines an upper surface upon which is disposed an electronic key pad 2224 for receiving user input and a digital LCD display screen 2228. The housing 2220 further defines a card slot 2230 through which a credit, debit or other card (not shown) may pass so that its magnetic stripe is read by the magnetic stripe reader of the terminal $2006_{a-d}$.

During operation of the terminal 2006a-d, various options appear on the screen 2228, which a customer or clerk may select by pressing an appropriate button on the key pad 2224.

A customer may make payment by paying cash to a store clerk, or by swiping a credit, debit or other payment card through card slot 2230.

Figure 23:
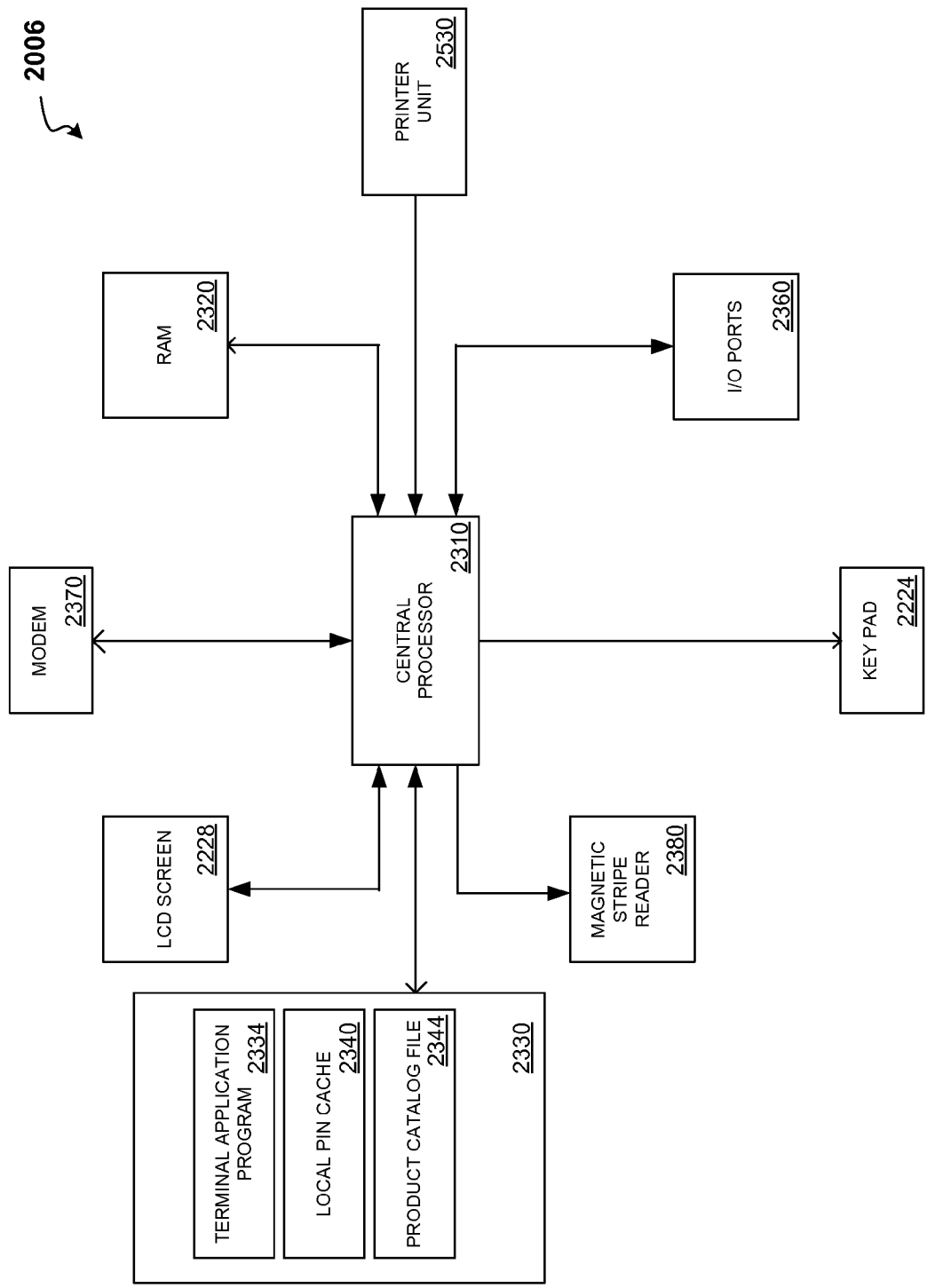
FIG. 23 shows a block diagrammatic representation of the electronic and other components of an implementation of the client terminal.

Turning now to FIG. 23, there is shown a block diagrammatic representation of the electronic and other components of an embodiment of the client terminal 2006$a$-$d$. As shown, the terminal 2006$a$-$d$ includes a central processor 2310 which may be realized as a 32-bit microprocessor. The terminal 2006$_{a-d}$ further includes RAM 2320 and ROM 2330 coupled to the processor 2310. The processor 2310 is also coupled to a number of other components, including an integrated printer unit 2350, I/O ports 2360, a modem 2370, key pad 2224, digital LCD screen 2228 and magnetic stripe reader 2380. As shown, the ROM 2330 stores instructions of a terminal application program 2334 and other data files described below. Except to the extent the components of the client terminal 2006$_{a-d}$ depicted in FIG. 23 are operating under the control of the application program 2334 in accordance with the invention, such components may function together so as to yield operation analogous to that occurring in conventional point-of-sale terminals, such as the Omni 3700 family of terminals available from Verifone.

As shown in FIG. 23, the ROM 2330 contains a local PIN cache 2340 containing prepaid PINs corresponding to those high-volume SKUs associated with the applicable terminal 2006$_{a-d}$. The ROM 2330 also includes update records 2342, each of which contains data relating to the sale of a prepaid PIN from the cache 2340. The ROM 2330 further includes a product catalog 2344, which contains the set of prepaid or other products and services available for purchase using the terminal 2006$_{a-d}$. Each record within the product catalog 2344 includes an identifying number to be keyed in via key pad 2224 to select the applicable product, and the internal identifier to be requested from the server 2002 when the product is selected. When the product being sold comprises prepaid telecommunications services (i.e., a "prepaid phone card"), the record specifies the denomination of the card, the associated carrier and region, and similar details.

In the exemplary embodiment an administrator of the server 2002 is permitted to adjust, for each client terminal 2006$a$-$d$, the high-water mark for each SKU vended by the terminal 2006$a$-$d$. The default high-water mark for each such SKU is zero, which indicates that the SKU is not cached within the PIN cache 2340 of the applicable terminal 2006$a$-$d$. In the exemplary embodiment the high-water mark will be known to the terminal 2006$a$-$d$ (e.g., downloaded to the terminal 2006$a$-$d$ as a part of the product catalog 2344).

Figure 24:
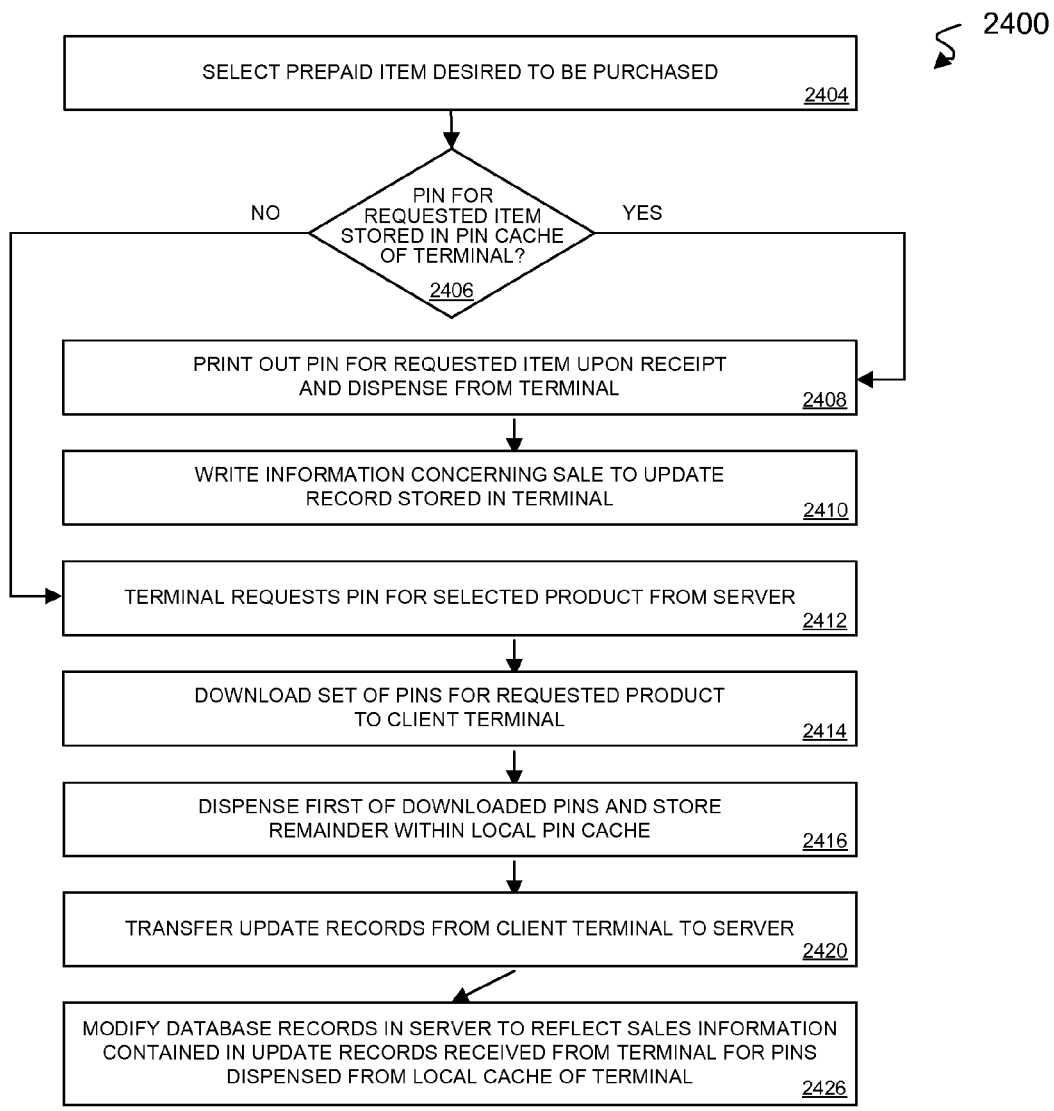
FIG. 24 is a flowchart depicting a process of selling an item of prepaid goods or services and replenishing a local PIN cache in accordance with the present invention.

Turning now to FIG. 24, a flowchart is provided of a process 2400 of selling an item of prepaid goods or services and replenishing a local PIN cache in accordance with the present invention. This process 2400 is initiated when a clerk using the terminal 2006$_{a-d}$ selects or otherwise identifies an item desired to be purchased by a customer (stage 2404). In this regard the clerk may enter either a shopkeeping unit (SKU) code corresponding to the desired item from the product catalog file 2344 (e.g., 12345 for $100 of telecommunications service from Verizon), or may instead scroll through a list of available products rendered on the screen 2228.

Prior to contacting the server 2002 in order to obtain a prepaid PIN corresponding to the requested product, the terminal 2006$a$-$d$ determines whether it has stored one or more of the corresponding prepaid PINs within its local PIN cache 2340 (stage 2406). If so, one of these prepaid PINs within the cache 2340 is used for the sale and printed out upon a receipt for the customer (stage 2408). Again, the receipt includes the requested PIN(s) purchased by the customer, and any instructions for using the PIN such as a telephone access number. In addition, the terminal application program 2334 locally writes the relevant information concerning the sale to one of the update records 2342 (stage 2410). Such information will typically include an order identification number, the current date/time and a code indicative of the clerk conducting the sale.

It may be appreciated that the availability of a desired prepaid PIN within the local PIN cache 2340 of a given terminal 2006$_{a-d}$ may significantly reduce the time associated with the purchasing process. This is because in many implementations a substantial portion of the time required to obtain a desired PIN from the server 2002 is devoted to dialing and connecting operations, rather than the actual transfer of data over the phone line or other network connection.

If, on the other hand, a prepaid PIN corresponding to the selected product (i.e., SKU) is unavailable within the cache 2340, the terminal 2006$a$-$d$ contacts the server 2002 and requests it (stage 2412). If a non-zero high water mark is associated with the requested product, then a set of PINs for the requested product is downloaded from the server 2002 to the terminal 2006$a$-$d$ (stage 2414) A first of these downloaded PINs is sold to the requesting consumer, while the remainder of the set of downloaded PINs are stored within the local PIN cache 2340 (stage 2416). In the exemplary embodiment the number of additional PINs downloaded is not larger than the high-water mark associated with the requested product, and may be lower based upon administrative controls and available inventory. In addition, any update records 2342 not previously transferred to the server 2002 are uploaded to the server 2002 upon contacting it to request additional PINs (stage 2420). This enables any reports subsequently generated for the operator of the applicable terminal 2006$a$-$d$ to accurately reflect the time of sale of each prepaid PIN to a consumer.

From an accounting perspective, the operator of the server 2002 may consider transfer of a set of PINs to the local PIN cache 2340 of a requesting terminal 2006$a$-$d$ to be equivalent to the actual sale of such PINs to an end-user. In this implementation the sales date/time field 320 of each corresponding record 312 within database 112 is initialized to the empty string upon transfer of the set of PINs from the server 2006$_{a-d}$ to the applicable cache 2340. Upon receipt at the server 2002 of the update record for each PIN downloaded to the cache 2340 of the terminal 2006$a$-$d$, the sales date/time field 320 of each corresponding record 312 is appropriately modified to reflect the actual sales date and time for the PIN indicated by the update record (stage 2426).

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

We claim:

1. A method of providing a personal identification number (PIN) from a client terminal, comprising:
   storing, at the client terminal, one or more PINs for plural prepaid products or services;
   receiving, at the client terminal, a request for a PIN associated with a desired prepaid product or service associated with a prepaid service provider;
   sending, from the client terminal, a PIN request to a server when the desired prepaid product or service does not correspond to one of the plural prepaid services;
   receiving, the PIN request at the server and obtaining an additional PIN from a PIN database;
   maintaining, by the server, the PIN database, wherein the PIN database comprises a plurality of sets of PINs associated with a corresponding plurality of prepaid services and a set of records wherein each of the records includes information identifying one of said plurality of prepaid services for which one of a plurality of client terminals is disposed to store plural PINs;
   sending the additional PIN from the server to the client terminal;
   receiving, at the client terminal, the additional PIN; and
   dispensing the additional PIN from the client terminal.

2. The method of claim 1 further including receiving and storing, at the client terminal and in response to the PIN request, a plurality of additional PINs associated with the desired prepaid product or service.

3. The method of claim 1 further including:
   receiving, at the client terminal, a request for a PIN associated with an additional desired prepaid product or service corresponding to one of the plural prepaid services; and
   dispensing, from the client terminal, at least one PIN associated with the additional desired prepaid product or service which is stored in the client terminal.

4. The method of claim 1 wherein no PINs are stored at the client terminal.

5. The method of claim 1 wherein the PIN is disposed for use in accessing pre-paid telephone service and the prepaid service provider is a telephone services provider.

6. The method of claim 1 wherein the PIN is disposed for use in purchasing a product.

7. The method of claim 1 further comprising:
   transmitting to the client terminal data describing a plurality of available products or services;
   providing, from the client terminal, a display of the plurality of available products; and
   receiving, at the client terminal from a user of the client terminal, a selection of one or more of the available products or services.

8. The method of claim 1 further comprising:
   transmitting to the client terminal data describing a plurality of provider names for the requested prepaid product or service;
   providing, from the client terminal, a display of the plurality of provider names; and
   receiving, at the client terminal from a user of the client terminal, a selection of one of the available provider names.

9. The method of claim 1 further comprising:
   transmitting to the client terminal data describing a plurality of monetary denominations available for the requested provider;
   providing, from the client terminal, a display of the plurality of monetary denominations; and
   receiving, at the client terminal from a user of the client terminal, a selection of one of the available monetary denominations.

10. The method of claim 1 wherein a dealer remits a portion of the payment to an account associated with the server.

11. The method of claim 1 further including providing a printed receipt to a user of the client terminal wherein the printed receipt includes at least one or more additional PINs.

12. A system for processing PIN transactions, comprising:
   a plurality of client terminals, said client terminals including:
      a processor;
      a first interface disposed to receive a first request for a PIN associated with a first desired prepaid service and a second request for a PIN associated with a second desired prepaid service;
      memory operatively coupled to the processor, the memory including instructions of an application program executed by the processor and caching at least a first requested PIN associated with the first desired prepaid service;
      a dispensing mechanism through which is dispensed, under the control of the application program, the first requested PIN in response to the first request for a PIN; and
      a second interface through which is transmitted, to a server, a PIN request generated by the application program when the application program determines that at least one PIN associated with the second desired prepaid service is not cached within the memory;
      wherein the dispending mechanism is further configured to dispense, under the control of the application program and in substantially real time relative to receipt of the second request for a PIN, a second requested PIN associated with the second desired prepaid service wherein the second requested PIN is received through the second interface; and
   a server system communicatively coupled to the plurality of client terminals, said server system including:
      one or more server computers, each of one said one or more server computers having one or more server processors and one or more server memories; and
      one or more PIN databases coupled to the one or more server computers, wherein said one or more PIN databases are configured to store one or more PINs for provision to one or more of the plurality of client terminals and wherein the one or more PIN databases include:
         a plurality of sets of PINs associated with a corresponding plurality of prepaid services, and
         a set of records wherein each of the records includes information identifying one of said plurality of prepaid services for which one of the client terminals is disposed to store plural PINs.

13. The system of claim 12 wherein the one or more server memories include instructions for execution on the one or more server processors for sending, to a first of the client terminals from which a PIN request corresponding to one of the plurality of prepaid services is received, at least one PIN associated with the one of the plurality of prepaid services.

14. The system of claim 13 wherein the at least one PIN is sent in substantially real time relative to the receipt of the PIN request.

* * * * *